(12) United States Patent
Al-Mousa

(10) Patent No.: US 12,054,999 B2
(45) Date of Patent: Aug. 6, 2024

(54) MAINTAINING AND INSPECTING A WELLBORE

(71) Applicant: Saudi Arabian Oil Company, Dhahran (SA)

(72) Inventor: Ahmed Al-Mousa, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 384 days.

(21) Appl. No.: 17/188,870

(22) Filed: Mar. 1, 2021

(65) Prior Publication Data
US 2022/0275692 A1 Sep. 1, 2022

(51) Int. Cl.
| E21B 17/10 | (2006.01) |
| E21B 23/04 | (2006.01) |
| E21B 37/02 | (2006.01) |
| E21B 41/00 | (2006.01) |
| E21B 47/08 | (2012.01) |
| G05D 1/00 | (2006.01) |

(52) U.S. Cl.
CPC ...... *E21B 17/1057* (2013.01); *E21B 23/0419* (2020.05); *E21B 37/02* (2013.01); *E21B 41/0085* (2013.01); *E21B 47/08* (2013.01); *G05D 1/04* (2013.01)

(58) Field of Classification Search
CPC .............. E21B 17/1057; E21B 23/001; E21B 23/0419; E21B 37/02; E21B 41/0085; E21B 47/08; G05D 1/04
See application file for complete search history.

(56) References Cited

U.S. PATENT DOCUMENTS

| 880,404 A | 2/1908 | Sanford |
| 1,033,655 A | 7/1912 | Baker |
(Continued)

FOREIGN PATENT DOCUMENTS

| AU | 636642 | 5/1993 |
| AU | 2007249417 | 11/2007 |
(Continued)

OTHER PUBLICATIONS

Nayak et al., Design of a New In-Pipe Inspection Robot, GCMM, 2014 (Year: 2014).*

(Continued)

*Primary Examiner* — Kyle R Quigley
(74) *Attorney, Agent, or Firm* — Fish & Richardson P.C.

(57) ABSTRACT

An assembly and a method for maintaining and inspecting a wellbore are described. The assembly includes a body. Multiple magnetic wheel sub-assemblies are adjustably coupled to the body. The magnetic wheel sub-assemblies position the body within the wellbore and reposition relative to the body in response to a wellbore narrowing or a wellbore widening. The assembly includes a tool connection coupled to the body. The tool connection couples a well tool to the body. The assembly includes a control sub-assembly to control the magnetic wheel sub-assemblies and operate the well tool within the wellbore. The assembly includes a power sub-assembly to supply power to the control sub-assembly and the well tool. The assembly includes a backup retrieval mechanism coupled to the body. The backup retrieval mechanism couples to a retrieval tool.

17 Claims, 15 Drawing Sheets

(56) References Cited

U.S. PATENT DOCUMENTS

| | | | |
|---|---|---|---|
| 1,258,273 A | 3/1918 | Titus et al. |
| 1,392,650 A | 10/1921 | Mcmillian |
| 1,491,066 A | 4/1924 | Patrick |
| 1,580,352 A | 4/1926 | Ercole |
| 1,591,264 A | 7/1926 | Baash |
| 1,621,947 A | 3/1927 | Moore |
| 1,638,494 A | 8/1927 | Lewis et al. |
| 1,789,993 A | 1/1931 | Switzer |
| 1,896,236 A | 2/1933 | Howard |
| 1,896,482 A | 2/1933 | Crowell |
| 1,897,297 A | 2/1933 | Brown |
| 1,949,498 A | 3/1934 | Frederick et al. |
| 2,047,774 A | 7/1936 | Greene |
| 2,121,002 A | 6/1938 | Baker |
| 2,121,051 A | 6/1938 | Ragan et al. |
| 2,187,487 A | 1/1940 | Burt |
| 2,189,697 A | 2/1940 | Baker |
| 2,222,233 A | 11/1940 | Mize |
| 2,286,075 A | 6/1942 | Evans |
| 2,304,793 A | 12/1942 | Bodine |
| 2,316,402 A | 4/1943 | Canon |
| 2,327,092 A | 8/1943 | Botkin |
| 2,377,249 A | 5/1945 | Lawrence |
| 2,411,260 A | 11/1946 | Glover et al. |
| 2,481,637 A | 9/1949 | Yancey |
| 2,546,978 A | 4/1951 | Collins et al. |
| 2,638,988 A | 5/1953 | Williams |
| 2,935,020 A | 8/1953 | Howard |
| 2,663,370 A | 12/1953 | Robert et al. |
| 2,672,199 A | 3/1954 | McKenna |
| 2,701,019 A | 2/1955 | Steed |
| 2,707,998 A | 5/1955 | Baker et al. |
| 2,708,973 A | 5/1955 | Twining |
| 2,728,599 A | 12/1955 | Moore |
| 2,734,581 A | 2/1956 | Bonner |
| 2,745,693 A | 5/1956 | Mcgill |
| 2,751,010 A | 6/1956 | Trahan |
| 2,762,438 A | 9/1956 | Naylor |
| 2,778,428 A | 1/1957 | Baker et al. |
| 2,806,532 A | 9/1957 | Baker et al. |
| 2,881,838 A | 4/1959 | Morse et al. |
| 2,887,162 A | 5/1959 | Le Bus et al. |
| 2,912,053 A | 11/1959 | Bruekelman |
| 2,912,273 A | 11/1959 | Chadderdon et al. |
| 2,915,127 A | 12/1959 | Abendroth |
| 2,947,362 A | 8/1960 | Smith |
| 2,965,175 A | 12/1960 | Ransom |
| 2,965,177 A | 12/1960 | Le Bus et al. |
| 2,965,183 A | 12/1960 | Le Bus et al. |
| 3,005,506 A | 10/1961 | Le Bus et al. |
| 3,023,810 A | 3/1962 | Anderson |
| 3,116,799 A | 1/1964 | Lemons |
| 3,147,536 A | 9/1964 | Lamphere |
| 3,191,677 A | 6/1965 | Kinley |
| 3,225,828 A | 12/1965 | Wisenbaker et al. |
| 3,308,886 A | 3/1967 | Evans |
| 3,352,593 A | 11/1967 | Webb |
| 3,369,603 A | 2/1968 | Trantham |
| 3,376,934 A | 4/1968 | William |
| 3,380,528 A | 4/1968 | Durwood |
| 3,381,748 A | 5/1968 | Peters et al. |
| 3,382,925 A | 5/1968 | Jennings |
| 3,409,084 A | 11/1968 | Lawson, Jr. et al. |
| 3,437,136 A | 4/1969 | Young |
| 3,554,278 A | 1/1971 | Reistle |
| 3,667,721 A | 6/1972 | Vujasinovic |
| 3,747,674 A | 7/1973 | Murray |
| 3,752,230 A | 8/1973 | Bernat et al. |
| 3,897,038 A | 7/1975 | Le Rouax |
| 3,915,426 A | 10/1975 | Le Rouax |
| 3,955,622 A | 5/1976 | Jones |
| 4,030,354 A | 6/1977 | Scott |
| 4,039,798 A | 8/1977 | Lyhall et al. |
| 4,042,019 A | 8/1977 | Henning |
| 4,059,155 A | 11/1977 | Greer |
| 4,099,699 A | 7/1978 | Allen |
| 4,190,112 A | 2/1980 | Davis |
| 4,215,747 A | 8/1980 | Cox |
| 4,227,573 A | 10/1980 | Pearce et al. |
| 4,254,983 A | 3/1981 | Harris |
| 4,276,931 A | 7/1981 | Murray |
| 4,285,400 A | 8/1981 | Mullins |
| 4,289,200 A | 9/1981 | Fisher |
| 4,296,822 A | 10/1981 | Ormsby |
| 4,325,534 A | 4/1982 | Roark et al. |
| 4,349,071 A | 9/1982 | Fish |
| 4,391,326 A | 7/1983 | Greenlee |
| 4,407,367 A | 10/1983 | Kydd |
| 4,412,130 A | 10/1983 | Winters |
| 4,413,642 A | 11/1983 | Smith et al. |
| 4,422,948 A | 12/1983 | Corley et al. |
| 4,467,996 A | 8/1984 | Baugh |
| 4,478,286 A | 10/1984 | Fineberg |
| 4,515,212 A | 5/1985 | Krugh |
| 4,538,684 A | 9/1985 | Sheffield |
| 4,562,888 A | 1/1986 | Collet |
| 4,603,578 A | 8/1986 | Stolz |
| 4,611,658 A | 9/1986 | Salerni et al. |
| 4,616,721 A | 10/1986 | Furse |
| 4,696,502 A | 9/1987 | Desai |
| 4,791,992 A | 12/1988 | Greenlee et al. |
| 4,834,184 A | 5/1989 | Streich et al. |
| 4,836,289 A | 6/1989 | Young |
| 4,869,321 A | 9/1989 | Hamilton |
| 4,877,085 A | 10/1989 | Pullig, Jr. |
| 4,898,240 A | 2/1990 | Wittrisch |
| 4,898,245 A | 2/1990 | Braddick |
| 4,928,762 A | 5/1990 | Mamke |
| 4,953,617 A | 9/1990 | Ross et al. |
| 4,997,225 A | 3/1991 | Denis |
| 5,012,863 A | 5/1991 | Springer |
| 5,013,005 A | 5/1991 | Nance |
| 5,054,833 A | 10/1991 | Bishop et al. |
| 5,060,737 A | 10/1991 | Mohn |
| 5,117,909 A | 6/1992 | Wilton et al. |
| 5,129,956 A | 7/1992 | Christopher et al. |
| 5,176,208 A | 1/1993 | Lalande et al. |
| 5,178,219 A | 1/1993 | Streich et al. |
| 5,197,547 A | 3/1993 | Morgan |
| 5,203,646 A | 4/1993 | Landsberger et al. |
| 5,257,669 A * | 11/1993 | Kerley ............... B25J 5/00 |
| | | | 180/7.1 |
| 5,295,541 A | 3/1994 | Ng et al. |
| 5,330,000 A | 7/1994 | Givens et al. |
| 5,343,946 A | 9/1994 | Morrill |
| 5,348,095 A | 9/1994 | Worrall |
| 5,358,048 A | 10/1994 | Brooks |
| 5,392,715 A | 2/1995 | Pelrine |
| 5,456,312 A | 10/1995 | Lynde et al. |
| 5,507,346 A | 4/1996 | Gano et al. |
| 5,580,114 A | 12/1996 | Palmer |
| 5,584,342 A | 12/1996 | Swinford |
| 5,605,366 A | 2/1997 | Beeman |
| 5,639,135 A | 6/1997 | Beeman |
| 5,667,015 A | 9/1997 | Harestad et al. |
| 5,673,754 A | 10/1997 | Taylor |
| 5,678,635 A | 10/1997 | Dunlap et al. |
| 5,685,982 A | 11/1997 | Foster |
| 5,698,814 A | 12/1997 | Parsons |
| 5,775,420 A | 7/1998 | Mitchell et al. |
| 5,806,596 A | 9/1998 | Hardy et al. |
| 5,833,001 A | 11/1998 | Song et al. |
| 5,842,518 A | 12/1998 | Soybel et al. |
| 5,875,841 A | 3/1999 | Wright et al. |
| 5,881,816 A | 3/1999 | Wright |
| 5,899,796 A | 5/1999 | Kamiyama et al. |
| 5,924,489 A | 7/1999 | Hatcher |
| 5,931,443 A | 8/1999 | Corte, Sr. |
| 5,944,101 A | 8/1999 | Hearn |
| 6,070,665 A | 6/2000 | Singleton et al. |
| 6,112,809 A | 9/2000 | Angle |
| 6,130,615 A | 10/2000 | Poteet |
| 6,138,764 A | 10/2000 | Scarsdale et al. |
| 6,155,428 A | 12/2000 | Bailey et al. |

(56) References Cited

U.S. PATENT DOCUMENTS

| | | |
|---|---|---|
| 6,247,542 B1 | 6/2001 | Kruspe et al. |
| 6,273,189 B1 | 8/2001 | Gissler et al. |
| 6,276,452 B1 | 8/2001 | Davis et al. |
| 6,371,204 B1 | 4/2002 | Singh et al. |
| 6,378,627 B1 | 4/2002 | Tubel et al. |
| 6,491,108 B1 | 12/2002 | Slup et al. |
| 6,510,900 B2 | 1/2003 | Dallas |
| 6,510,947 B1 | 1/2003 | Schulte et al. |
| 6,595,289 B2 | 7/2003 | Tumlin et al. |
| 6,637,511 B2 | 10/2003 | Linaker |
| 6,679,330 B1 | 1/2004 | Compton et al. |
| 6,688,386 B2 | 2/2004 | Cornelssen |
| 6,698,712 B2 | 3/2004 | Milberger et al. |
| 6,729,392 B2 | 5/2004 | DeBerry et al. |
| 6,768,106 B2 | 7/2004 | Gzara et al. |
| 6,808,023 B2 | 10/2004 | Smith et al. |
| 6,811,032 B2 | 11/2004 | Schulte et al. |
| 6,854,521 B2 | 2/2005 | Echols et al. |
| 6,880,639 B2 | 4/2005 | Rhodes et al. |
| 6,899,178 B2 | 5/2005 | Tubel |
| 6,913,084 B2 | 7/2005 | Boyd |
| 7,049,272 B2 | 5/2006 | Sinclair et al. |
| 7,051,810 B2 | 5/2006 | Halliburton |
| 7,082,994 B2 | 8/2006 | Frost, Jr. et al. |
| 7,090,019 B2 | 8/2006 | Barrow et al. |
| 7,096,950 B2 | 8/2006 | Howlett et al. |
| 7,117,941 B1 | 10/2006 | Gano |
| 7,117,956 B2 | 10/2006 | Grattan et al. |
| 7,128,146 B2 | 10/2006 | Baugh |
| 7,150,328 B2 | 12/2006 | Marketz et al. |
| 7,174,764 B2 | 2/2007 | Oosterling et al. |
| 7,188,568 B2 * | 3/2007 | Stout ................ F16L 55/32 73/866.5 |
| 7,188,674 B2 | 3/2007 | McGavern, III et al. |
| 7,188,675 B2 | 3/2007 | Reynolds |
| 7,218,235 B1 | 5/2007 | Rainey |
| 7,231,975 B2 | 6/2007 | Lavaure et al. |
| 7,249,633 B2 | 7/2007 | Ravensbergen et al. |
| 7,275,591 B2 | 10/2007 | Allen et al. |
| 7,284,611 B2 | 10/2007 | Reddy et al. |
| 7,303,010 B2 | 12/2007 | de Guzman et al. |
| 7,363,860 B2 | 4/2008 | Wilson |
| 7,383,889 B2 | 6/2008 | Ring |
| 7,389,817 B2 | 6/2008 | Almdahl |
| 7,398,832 B2 | 7/2008 | Brisco |
| 7,405,182 B2 | 7/2008 | Verrett |
| 7,418,860 B2 | 9/2008 | Austerlitz et al. |
| 7,424,909 B2 | 9/2008 | Roberts et al. |
| 7,488,705 B2 | 2/2009 | Reddy et al. |
| 7,497,260 B2 | 3/2009 | Telfer |
| 7,533,731 B2 | 5/2009 | Corre |
| 7,591,305 B2 | 9/2009 | Brookey et al. |
| 7,600,572 B2 | 10/2009 | Slup et al. |
| 7,617,876 B2 | 11/2009 | Patel et al. |
| 7,621,324 B2 | 11/2009 | Atencio |
| 7,712,527 B2 | 5/2010 | Roddy |
| 7,735,564 B2 | 6/2010 | Guerrero |
| 7,762,323 B2 | 7/2010 | Frazier |
| 7,762,330 B2 | 7/2010 | Saylor, III et al. |
| 7,802,621 B2 | 9/2010 | Richards et al. |
| 7,878,240 B2 | 2/2011 | Garcia |
| 7,934,552 B2 | 5/2011 | La Rovere |
| 7,965,175 B2 | 6/2011 | Yamano |
| 8,002,049 B2 | 8/2011 | Keese et al. |
| 8,056,621 B2 | 11/2011 | Ring et al. |
| 8,069,916 B2 | 12/2011 | Giroux et al. |
| 8,157,007 B2 | 4/2012 | Nicolas |
| 8,201,693 B2 | 6/2012 | Jan |
| 8,210,251 B2 | 7/2012 | Lynde et al. |
| 8,376,051 B2 | 2/2013 | McGrath et al. |
| 8,424,611 B2 | 4/2013 | Smith et al. |
| 8,453,724 B2 | 6/2013 | Zhou |
| 8,496,055 B2 | 7/2013 | Mootoo et al. |
| 8,579,024 B2 | 11/2013 | Mailand et al. |
| 8,579,037 B2 | 11/2013 | Jacob |
| 8,596,463 B2 | 12/2013 | Burkhard |
| 8,662,182 B2 | 3/2014 | Redlinger et al. |
| 8,726,983 B2 | 5/2014 | Khan |
| 8,770,276 B1 | 7/2014 | Nish et al. |
| 8,899,338 B2 | 12/2014 | Elsayed et al. |
| 8,991,489 B2 | 3/2015 | Redlinger et al. |
| 9,079,222 B2 | 7/2015 | Burnett et al. |
| 9,109,433 B2 | 8/2015 | DiFoggio et al. |
| 9,133,671 B2 | 9/2015 | Kellner |
| 9,163,469 B2 | 10/2015 | Broussard et al. |
| 9,181,782 B2 | 11/2015 | Berube et al. |
| 9,212,532 B2 | 12/2015 | Leuchtenberg et al. |
| 9,234,394 B2 | 1/2016 | Wheater et al. |
| 9,353,589 B2 | 5/2016 | Hekelaar |
| 9,359,861 B2 | 6/2016 | Burgos |
| 9,410,066 B2 | 8/2016 | Ghassemzadeh |
| 9,416,617 B2 | 8/2016 | Wiese et al. |
| 9,441,441 B1 | 9/2016 | Hickie |
| 9,441,451 B2 | 9/2016 | Jurgensmeier |
| 9,528,354 B2 | 12/2016 | Loiseau et al. |
| 9,551,200 B2 | 1/2017 | Read et al. |
| 9,574,417 B2 | 2/2017 | Laird et al. |
| 9,617,829 B2 | 4/2017 | Dale et al. |
| 9,657,213 B2 | 5/2017 | Murphy et al. |
| 9,657,884 B1 * | 5/2017 | Carte .................... F16L 55/44 |
| 9,903,192 B2 | 2/2018 | Entchev |
| 9,976,407 B2 | 5/2018 | Ash et al. |
| 10,087,752 B2 | 10/2018 | Bedonet |
| 10,161,194 B2 | 12/2018 | Clemens et al. |
| 10,198,929 B2 | 2/2019 | Snyder |
| 10,202,817 B2 | 2/2019 | Arteaga |
| 10,266,698 B2 | 4/2019 | Cano et al. |
| 10,273,770 B2 | 4/2019 | Van Der Ende |
| 10,280,706 B1 | 5/2019 | Sharp, III |
| 10,301,898 B2 | 5/2019 | Orban |
| 10,301,989 B2 | 5/2019 | Imada |
| 10,544,640 B2 | 1/2020 | Hekelaar et al. |
| 10,584,546 B1 | 3/2020 | Ford |
| 10,626,698 B2 | 4/2020 | Al-Mousa et al. |
| 10,787,888 B2 | 9/2020 | Andersen |
| 10,837,254 B2 | 11/2020 | Al-Mousa et al. |
| 10,975,654 B1 | 4/2021 | Neacsu et al. |
| 10,982,504 B2 | 4/2021 | Al-Mousa et al. |
| 11,008,824 B2 | 5/2021 | Al-Mousa et al. |
| 2002/0053428 A1 | 5/2002 | Maples |
| 2002/0060079 A1 | 5/2002 | Metcalfe et al. |
| 2002/0096322 A1 * | 7/2002 | Barrett .................. E21B 44/005 166/250.01 |
| 2002/0102136 A1 * | 8/2002 | Holland .................. B29C 63/34 405/184.1 |
| 2002/0195252 A1 | 12/2002 | Maguire |
| 2003/0047312 A1 | 3/2003 | Bell |
| 2003/0098064 A1 | 5/2003 | Kohli et al. |
| 2003/0132224 A1 | 7/2003 | Spencer |
| 2003/0150608 A1 | 8/2003 | Smith, Jr. et al. |
| 2003/0221840 A1 | 12/2003 | Whitelaw |
| 2004/0031940 A1 | 2/2004 | Biester |
| 2004/0040707 A1 | 3/2004 | Dusterhoft et al. |
| 2004/0065446 A1 | 4/2004 | Tran et al. |
| 2004/0074819 A1 | 4/2004 | Burnett |
| 2004/0095248 A1 | 5/2004 | Mandel |
| 2004/0168796 A1 | 9/2004 | Baugh et al. |
| 2004/0216891 A1 | 11/2004 | Maguire |
| 2005/0024231 A1 | 2/2005 | Fincher et al. |
| 2005/0056427 A1 | 3/2005 | Clemens et al. |
| 2005/0087585 A1 | 4/2005 | Copperthite et al. |
| 2005/0167945 A1 | 8/2005 | Sommers et al. |
| 2005/0263282 A1 | 12/2005 | Jeffrey et al. |
| 2005/0288819 A1 * | 12/2005 | de Guzman ............ F16L 55/38 700/245 |
| 2006/0082462 A1 | 4/2006 | Crook |
| 2006/0105896 A1 | 5/2006 | Smith et al. |
| 2006/0243453 A1 | 11/2006 | McKee |
| 2007/0114039 A1 | 5/2007 | Hobdy et al. |
| 2007/0137528 A1 | 6/2007 | Le Roy-Ddelage et al. |
| 2007/0181304 A1 | 8/2007 | Rankin et al. |
| 2007/0204999 A1 | 9/2007 | Cowie et al. |
| 2007/0256864 A1 | 11/2007 | Robichaux et al. |
| 2007/0256867 A1 | 11/2007 | DeGeare et al. |

(56) References Cited

U.S. PATENT DOCUMENTS

| | | |
|---|---|---|
| 2008/0007421 A1 | 1/2008 | Liu et al. |
| 2008/0087439 A1 | 4/2008 | Dallas |
| 2008/0236841 A1 | 10/2008 | Howlett et al. |
| 2008/0251253 A1 | 10/2008 | Lumbye |
| 2008/0314591 A1 | 12/2008 | Hales et al. |
| 2009/0194290 A1 | 8/2009 | Parks et al. |
| 2009/0250220 A1 | 10/2009 | Stamoulis |
| 2009/0308656 A1 | 12/2009 | Chitwood |
| 2010/0051265 A1 | 3/2010 | Hurst et al. |
| 2010/0193124 A1 | 8/2010 | Nicolas |
| 2010/0235018 A1* | 9/2010 | Christ .................... G01N 29/11 348/81 |
| 2010/0258289 A1 | 10/2010 | Lynde et al. |
| 2010/0263856 A1 | 10/2010 | Lynde et al. |
| 2010/0270018 A1 | 10/2010 | Howlett |
| 2011/0036570 A1 | 2/2011 | La Rovere et al. |
| 2011/0056681 A1 | 3/2011 | Khan |
| 2011/0067869 A1 | 3/2011 | Bour et al. |
| 2011/0168411 A1 | 7/2011 | Braddick |
| 2011/0203794 A1 | 8/2011 | Moffitt et al. |
| 2011/0259609 A1 | 10/2011 | Hessels et al. |
| 2011/0273291 A1 | 11/2011 | Adams |
| 2011/0278021 A1 | 11/2011 | Travis et al. |
| 2012/0012335 A1 | 1/2012 | White et al. |
| 2012/0067447 A1 | 3/2012 | Ryan et al. |
| 2012/0085538 A1 | 4/2012 | Guerrero |
| 2012/0118571 A1 | 5/2012 | Zhou |
| 2012/0170406 A1 | 7/2012 | DiFoggio et al. |
| 2012/0285684 A1 | 11/2012 | Crow et al. |
| 2012/0325555 A1* | 12/2012 | Jette ........................ E21B 7/265 175/26 |
| 2013/0062055 A1 | 3/2013 | Tolman et al. |
| 2013/0134704 A1 | 5/2013 | Klimack |
| 2013/0213654 A1 | 8/2013 | Dewey et al. |
| 2013/0240207 A1 | 9/2013 | Frazier |
| 2013/0269097 A1 | 10/2013 | Alammari |
| 2013/0296199 A1 | 11/2013 | Ghassemzadeh |
| 2013/0299194 A1 | 11/2013 | Bell |
| 2014/0090898 A1 | 4/2014 | Moriarty |
| 2014/0138091 A1 | 5/2014 | Fuhst |
| 2014/0158350 A1 | 6/2014 | Castillo et al. |
| 2014/0189968 A1* | 7/2014 | Kim ........................ B08B 9/049 15/88 |
| 2014/0231068 A1 | 8/2014 | Isaksen |
| 2014/0251616 A1 | 9/2014 | O'Rourke et al. |
| 2014/0345367 A1 | 11/2014 | Mekid et al. |
| 2015/0013994 A1 | 1/2015 | Bailey et al. |
| 2015/0096738 A1 | 4/2015 | Atencio |
| 2015/0152704 A1 | 6/2015 | Tunget |
| 2015/0275649 A1 | 10/2015 | Orban et al. |
| 2016/0076327 A1 | 3/2016 | Glaser et al. |
| 2016/0084034 A1 | 3/2016 | Roane et al. |
| 2016/0130914 A1 | 5/2016 | Steele |
| 2016/0160106 A1 | 6/2016 | Jamison et al. |
| 2016/0237810 A1 | 8/2016 | Beaman et al. |
| 2016/0281458 A1 | 9/2016 | Greenlee |
| 2016/0305215 A1 | 10/2016 | Harris et al. |
| 2016/0340994 A1 | 11/2016 | Ferguson et al. |
| 2017/0044864 A1 | 2/2017 | Sabins et al. |
| 2017/0058628 A1 | 3/2017 | Wijk et al. |
| 2017/0067313 A1 | 3/2017 | Connell et al. |
| 2017/0089166 A1 | 3/2017 | Sullivan |
| 2018/0010418 A1 | 1/2018 | VanLue |
| 2018/0030809 A1 | 2/2018 | Harestad et al. |
| 2018/0058167 A1 | 3/2018 | Finol et al. |
| 2018/0187498 A1 | 7/2018 | Soto et al. |
| 2018/0209565 A1 | 7/2018 | Lingnau |
| 2018/0245427 A1 | 8/2018 | Jimenez et al. |
| 2018/0252069 A1 | 9/2018 | Abdollah et al. |
| 2018/0313715 A1* | 11/2018 | Cichosz ................. G01N 29/12 |
| 2019/0024473 A1 | 1/2019 | Arefi |
| 2019/0049017 A1 | 2/2019 | McAdam et al. |
| 2019/0087548 A1 | 3/2019 | Bennett et al. |
| 2019/0186232 A1 | 6/2019 | Ingram |
| 2019/0203551 A1 | 7/2019 | Davis et al. |
| 2019/0284894 A1 | 9/2019 | Schmidt et al. |
| 2019/0284898 A1 | 9/2019 | Fagna et al. |
| 2019/0301258 A1 | 10/2019 | Li |
| 2019/0316424 A1 | 10/2019 | Robichaux et al. |
| 2019/0338615 A1 | 11/2019 | Landry |
| 2020/0032604 A1 | 1/2020 | Al-Ramadhan |
| 2020/0056446 A1 | 2/2020 | Al-Mousa et al. |
| 2020/0230668 A1* | 7/2020 | Baek ....................... B08B 9/051 |
| 2020/0240225 A1 | 7/2020 | King et al. |
| 2020/0384512 A1* | 12/2020 | Liu .......................... F16L 55/32 |
| 2021/0025259 A1 | 1/2021 | Al-Mousa et al. |
| 2021/0054696 A1 | 2/2021 | Golinowski et al. |
| 2021/0054706 A1 | 2/2021 | Al-Mousa et al. |
| 2021/0054708 A1 | 2/2021 | Al-Mousa et al. |
| 2021/0054710 A1 | 2/2021 | Neacsu et al. |
| 2021/0054716 A1 | 2/2021 | Al-Mousa et al. |
| 2021/0131212 A1 | 5/2021 | Al-Mousa et al. |
| 2021/0131215 A1 | 5/2021 | Al-Mousa et al. |
| 2021/0140267 A1 | 5/2021 | Al-Mousa et al. |
| 2021/0148503 A1* | 5/2021 | Fekrmandi ........... B62D 57/032 |
| 2022/0080579 A1* | 3/2022 | Nelson ................... F16L 55/28 |

FOREIGN PATENT DOCUMENTS

| | | |
|---|---|---|
| CA | 1329349 C | 5/1994 |
| CA | 2441138 | 3/2004 |
| CA | 2762217 | 5/2015 |
| CA | 2802988 | 10/2015 |
| CA | 2879985 | 4/2016 |
| CA | 2734032 | 6/2016 |
| CN | 203292820 | 11/2013 |
| CN | 103785923 | 6/2016 |
| CN | 104712320 | 12/2016 |
| CN | 107060679 | 8/2017 |
| CN | 107191152 | 9/2017 |
| CN | 107227939 | 10/2017 |
| DK | 2545245 | 4/2017 |
| DK | 2236742 | 8/2017 |
| EP | 0792997 | 1/1999 |
| EP | 2119867 | 11/2009 |
| EP | 2964874 | 1/2016 |
| EP | 2545245 | 4/2017 |
| GB | 958734 | 5/1964 |
| GB | 2021178 | 11/1979 |
| GB | 2392183 | 2/2004 |
| GB | 2396634 | 6/2004 |
| GB | 2414586 | 11/2005 |
| GB | 2425138 | 10/2006 |
| GB | 2453279 | 1/2009 |
| GB | 2492663 | 1/2014 |
| NO | 333538 | 7/2013 |
| NO | 20170293 | 8/2018 |
| OA | 5503 A | 4/1981 |
| WO | WO 1989012728 | 12/1989 |
| WO | WO 1996039570 | 12/1996 |
| WO | WO 2002090711 | 11/2002 |
| WO | WO 2004046497 | 6/2004 |
| WO | WO 2010132807 | 11/2010 |
| WO | WO 2012161854 | 11/2012 |
| WO | WO 2012164023 | 12/2012 |
| WO | WO 2013109248 | 7/2013 |
| WO | WO 2015112022 | 7/2015 |
| WO | WO 2016011085 | 1/2016 |
| WO | WO 2016040310 | 3/2016 |
| WO | WO 2016140807 | 9/2016 |
| WO | WO 2017043977 | 3/2017 |
| WO | WO 2018017104 | 1/2018 |
| WO | WO 2018164680 | 9/2018 |
| WO | WO 2019027830 | 2/2019 |
| WO | WO 2019132877 | 7/2019 |
| WO | WO 2019231679 | 12/2019 |

OTHER PUBLICATIONS

Deepak et al., Development of in-pipe robots for inspection and cleaning tasks, IJIUS, 2016 (Year: 2016).*

(56) References Cited

OTHER PUBLICATIONS

Ciszewski et al., Design, Modelling and Laboratory Testing of a Pipe Inspection Robot, Archive of Mechanical Engineering, 2015 (Year: 2015).*
Ahmed et al., Design and Control of MIRA, DFKI, Jul. 3, 2015 (Year: 2015).*
Kim et al., An In-pipe Robot with Multi-axial Differential Gear Mechanism, IEEE, 2013 (Year: 2013).*
Zhao et al., Design and Analysis of Independently Adjustable Large In-Pipe Robot for Long-Distance Pipeline, Appl. Sci., 2020 (Year: 2020).*
Al-Ansari et al., "Thermal Activated Resin to Avoid Pressure Build-Up in Casing-Casing Annulus (CCA)," SA-175425-MS, Society of Petroleum Engineers (SPE), presented at the SPE Offshore Europe Conference and Exhibition, Sep. 8-11, 2015, 11 pages.
Al-Ibrahim et al., "Automated Cyclostratigraphic Analysis in Carbonate Mudrocks Using Borehole Images," Article #41425, posted presented at the 2014 AAPG Annual Convention and Exhibition, Search and Discovery, Apr. 6-9, 2014, 4 pages.
Bautista et al., "Probability-based Dynamic Time Warping for Gesture Recognition on RGB-D data," WDIA 2012: Advances in Depth Image Analysis and Application, 126-135, International Workshop on Depth Image Analysis and Applications, 2012, 11 pages.
Boriah et al., "Similarity Measures for Categorical Data: A Comparative Evaluation," presented at the SIAM International Conference on Data Mining, SDM 2008, Apr. 24-26, 2008, 12 pages.
Bruton et al., "Whipstock Options for Sidetracking," Oilfield Review, 26:1, Spring 2014, 10 pages.
Edwards et al., "Assessing Uncertainty in Stratigraphic Correlation: A Stochastic Method Based on Dynamic Time Warping," RM13, Second EAGE Integrated Reservoir Modelling Conference, Nov. 16-19, 2014, 2 pages.
Edwards, "Construction de modèles stratigraphiques à partir de données éparses," Stratigraphie, Université de Lorraine, 2017, 133 pages, English abstract.
Fischer, "The Lofer Cyclothems of the Alpine Triassic, " published in Merriam, Symposium on Cyclic Sedimentation: Kansas Geological Survey (KGS), Bulletin, 1964, 169: 107-149, 50 pages.
Forum Energy Technologies "Drill Pipe Float Valves," 2019, Catalog, 6 pages.
Hernandez-Vela et al., "Probability-based Dynamic Time Warping and Bag-of-Visual-and-Depth-Words for human Gesture Recognition in RGB-D," Pattern Recognition Letters 50: 112-121, 2014, 10 pages.
Herrera and Bann, "Guided seismic-to-well tying based on dynamic time warping," SEG Las Vegas 2012 Annual Meeting, Nov. 2012, 6 pages.
Hydril "Checkguard" Kellyguard Drill Stem Valves, Catalog DSV 2003, Brochure, 9 pages.
Keogh and Ratanamahatana, "Exact indexing of dynamic time warping," Knowledge and Information Systems, Springer-Verlag London Ltd., 2004, 29 pages.
Lallier et al., "3D Stochastic Stratigraphic Well Correlation of Carbonate Ramp Systems," IPTC 14046, International Petroleum Technology Conference (IPTC), presented at the International Petroleum Technology Conference, Dec. 7-9, 2009, 5 pages.
Lallier et al., "Management of ambiguities in magnetostratigraphic correlation," Earth and Planetary Science Letters, 2013, 371-372: 26-36, 11 pages.
Lallier et al., "Uncertainty assessment in the stratigraphic well correlation of a carbonate ramp: Method and application of the Beausset Basin, SE France," C. R. Geoscience 348: 499-509, 2016, 11 pages.

Lineman et al., "Well to Well Log Correlation Using Knowledge-Based Systems and Dynamic Depth Warping," SPWLA Twenty-Eighth Annual Logging Symposium, Jun. 29-Jul. 2, 1987, 25 pages.
Nakanishi and Nakagawa, "Speaker-Independent Word Recognition by Less Cost and Stochastic Dynamic Time Warping Method," ISCA Archive, European Conference on Speech Technology, Sep. 1987, 4 pages.
packardusa.com [online], "Drop-in Check Valves," Packard International, available on or before Jul. 6, 2007, via Internet Archive: Wayback Machine URL <http://web.archive.org/web/20070706210423/http://packardusa.com/productsandservices5.asp>, retrieved on May 11, 2021, URL <www.packardusa.com/productsandservices5.asp>, 2 pages.
Pels et al., "Automated biostratigraphic correlation of palynological records on the basis of shapes of pollen curves and evaluation of next-best solutions," Palaeogeography, Palaeoclimatology, Palaeoecology 124: 17-37, 1996, 21 pages.
Pollack et al., "Automatic Well Log Correlation," AAPG Annual Convention and Exhibition, Apr. 3, 2017, 1 page, Abstract Only.
Rudman and Lankston, "Stratigraphic Correlation of Well Logs by Computer Techniques," The American Association of Petroleum Geologists, Mar. 1973, 53:3 (557-588), 12 pages.
Sakoe and Chiba, "Dynamic Programming Algorithm Optimization for Spoken Word Recognition," IEEE Transactions on Acoustics, Speech and Signal Processing, ASSP-26:1, Feb. 1978, 7 pages.
Salvador and Chan, "FastDTW: Toward Accurate Dynamic Time Warping in Linear Time and Space," presented at the KDD Workshop on Mining Temporal and Sequential Data, Intelligent Data Analysis 11(5):70-80, Jan. 2004, 11 pages.
Sayhi, "peakdet: Peak detection using MATLAB," Jul. 2012, 4 pages.
Scribd [online], "Milling Practices and Procedures," retrieved from URL <https://www.scribd.com/document/358420338/Milling-Rev-2-Secured>, 80 pages.
Silva and Koegh, "Prefix and Suffix Invariant Dynamic Time Warping," IEEE Computer Society, presented at the IEEE 16th International Conference on Data Mining, 2016, 6 pages.
Smith and Waterman, "New Stratigraphic Correlation Techniques," Journal of Geology, 1980, 88: 451-457, 8 pages.
Startzman and Kuo, "A Rule-Based System for Well Log Correlation," SPE Formative Evaluation, Society of Petroleum Engineers (SPE), Sep. 1987, 9 pages.
Tam International Inflatable and Swellable Packers, "TAM Scab Liner brochure," Tam International, available on or before Nov. 15, 2016, 4 pages.
Tomasi et al., "Correlation optimized warping and dynamic time warping as preprocessing methods for chromatographic data," Journal of Chemometrics 18: 231-241, 2004, 11 pages.
Uchida et al., "Non-Markovian Dynamic Time Warping," presented at the 21st International Conference on Pattern Recognition (ICPR), Nov. 11-15, 2012, 4 pages.
Waterman and Raymond, "The Match Game: New Stratigraphic Correlation Algorithms," Mathematical Geology, 19: 2, 1987, 19 pages.
Weatherford, "Micro-Seal Isolation System-Bow (MSIS-B)," Weatherford Swellable Well Construction Products, Brochure, 2009-2011, 2 pages.
Zoraster et al., "Curve Alignment for Well-to-Well Log Correlation," SPE 90471, Society of Petroleum Engineers (SPE), presented at the SPE Annual Technical Conference and Exhibition, Sep. 26-29, 2004, 6 pages.
PCT International Search Report and Written Opinion in International Appln. No. PCT/US2022/018285, dated May 31, 2022, 13 pages.
Yahya et al., "Development and Adaptability of In-Pipe Inspection Robots," IOSR Journal of Mechanical and Civil Engineering (IOSR-JMCE), Jan. 2014, 9 pages.

\* cited by examiner

MAINTAINING AND INSPECTING A WELLBORE

TECHNICAL FIELD

This disclosure relates to a wellbore, for example, through which hydrocarbons are produced.

BACKGROUND

Wellbores in an oil and gas well are filled with both liquid and gaseous phases of various fluids and chemicals including water, oils, and hydrocarbon gases. A wellbore completion is installed in the wellbore to seal the wellbore from the formations of the Earth and to control the flow of oil and gas from the wellbore to the surface of the Earth. The wellbore completion can include multiple components including isolation valves, tubing, tubing joints, pumps, liners, branches, and shoes. Maintenance tasks or inspections or both may be performed on the components of the wellbore completion assembly.

SUMMARY

This disclosure describes technologies related to maintaining and inspecting a wellbore with a wellbore maintenance and inspection assembly. Implementations of the present disclosure include a wellbore maintenance and inspection assembly. The wellbore maintenance and inspection assembly includes a body to be disposed in a wellbore.

The wellbore maintenance and inspection assembly includes a magnetic wheel assembly including multiple magnetic wheel sub-assemblies adjustably coupled to the body. The magnetic wheel assembly positions the body within the wellbore and repositions the magnetic wheel sub-assemblies relative to the body in response to a wellbore narrowing or a wellbore widening. In some implementations, each of the magnetic wheel sub-assemblies include a magnetic wheel to couple to a surface of the wellbore. In some implementations, each of the magnetic wheel sub-assemblies include a hydraulic arm coupled to the magnetic wheel and the body. The hydraulic arm positions the magnetic wheel in contact with the surface of the wellbore. In some implementations, each of the magnetic wheel sub-assemblies include a support arm coupled to hydraulic arm and the body. The support arm supports the hydraulic arm. In some implementations, each of the magnetic wheel sub-assemblies include a drive spring arm coupled to the magnetic wheel and the body. The drive spring arm articulates in response to the hydraulic arm positioning the magnetic wheel and rotates the magnetic wheel. In some implementations, the magnetic wheel assembly includes six magnetic wheel sub-assemblies.

The wellbore maintenance and inspection assembly includes a tool connection mechanically coupled to the body. The tool connection couples a well tool to the body. In some implementations, the assembly further includes a well tool to perform a maintenance or inspection task on the wellbore. The well tool includes brushes to clean a surface of the wellbore.

The wellbore maintenance and inspection assembly includes a control sub-assembly mechanically coupled to the body, the magnetic wheel assembly, and the tool connection. The control sub-assembly controls the magnetic wheel assembly and operates the well tool within the wellbore. In some implementations, the control sub-assembly further includes a sensor to sense a condition and transmit a signal representing the condition. The condition is one or more of a pressure, a temperature, a depth, a conductivity, a pH, a dimension of the wellbore, or an orientation of the body relative to the wellbore and the surface of the Earth.

In some implementations, the control sub-assembly includes one or more computer processors and a non-transitory computer-readable storage medium storing instructions executable by the one or more computer processors to cause the one or more computer processors to perform operations. The operations include receiving a signal representing the condition from the sensor, comparing the signal representing the condition to the instructions, and responsive to the comparison of the signal representing the condition and the instructions, generating a command signal to operate the magnetic wheel sub-assembly or the well tool.

In some implementations, the condition is the dimension of the wellbore. In such implementations, the one or more computer processors further receive a first dimension of the wellbore, receive a second dimension of the wellbore, and compare the first dimension to the second dimension. The one or more computer processors then, where the comparison indicates the wellbore narrowing, responsive to the comparison of the first dimension of the wellbore to the second dimension of the wellbore, further generate a command signal to reposition the magnetic wheel sub-assemblies relative to the body in response to the wellbore narrowing.

In some implementations, the condition is the dimension of the wellbore. In such implementations, the one or more computer processors further receive a first dimension of the wellbore, receive a second dimension of the wellbore, and compare the first dimension to the second dimension. The one or more computer processors then, where the comparison indicates the wellbore widening, responsive to the comparison of the first dimension of the wellbore to the second dimension of the wellbore, further generate a command signal to reposition the magnetic wheel sub-assemblies relative to the body in response to the wellbore widening.

In some implementations, the control sub-assembly further includes a telemetry receiver to receive a reprogramming signal from a remote control station. The reprogramming signal instructs the one or more computer processors to perform a different operation from the operation stored in the non-transitory computer-readable storage medium.

In some implementations, the command signal includes a signal to the magnetic wheel assembly to rotate, stop rotating, or lock one or more of the magnetic wheels. In some implementations, one or more of the magnetic wheels are locked when engaged to a surface of the wellbore.

In some implementations, the assembly includes a power sub-assembly disposed within the body. The power sub-assembly supplies power to the control sub-assembly and the well tool. In some implementations, the power sub-assembly further includes a turbine to generate power from a wellbore fluid flow and supply the power to the power sub-assembly to power the control sub-assembly or the well tool.

The wellbore maintenance and inspection assembly includes a backup retrieval mechanism mechanically coupled to the body. The backup retrieval mechanism couples to a retrieval tool. In some implementations, the retrieval tool is a GS tool and the backup retrieval mechanism couples to the GS tool.

In some implementations, the assembly further includes a hydraulic sub-assembly to flow a hydraulic fluid to and from each hydraulic arm of each magnetic wheel assembly. In some implementations, the hydraulic sub-assembly includes a hydraulic fluid supply reservoir. In some implementations, the hydraulic sub-assembly includes a hydraulic control valve to control a fluid flow to and from each hydraulic arm. In some implementations, the hydraulic sub-assembly includes multiple hydraulic conduits fluidically coupled to the hydraulic fluid supply reservoir and each hydraulic arm to flow the fluid to flow a hydraulic control fluid to and from the each hydraulic arm.

Further implementations of the present disclosure include a method for maintaining a wellbore with a wellbore maintenance and inspection assembly positioned in the wellbore. The assembly includes a body to be disposed in a wellbore. The assembly includes a magnetic wheel assembly. The magnetic wheel assembly includes multiple magnetic wheel sub-assemblies adjustably coupled to the body. The magnetic wheel assembly positions the body within the wellbore and reposition the magnetic wheel sub-assemblies relative to the body in response to a wellbore narrowing or a wellbore widening. The assembly includes a tool connection mechanically coupled to the body. The tool connection couples a well tool to the body. The assembly includes a sensor mechanically coupled to the body. The sensor senses a condition and transmit a signal representing the condition. The condition is one or more of a pressure, a temperature, a depth, a conductivity, a pH, a dimension of the wellbore, or an orientation of the body relative to the wellbore and a surface of the Earth.

The assembly includes a control sub-assembly coupled to the body. The control sub-assembly is operatively coupled to the magnetic wheel assembly and the tool connection. The control sub-assembly includes one or more computer processors and a non-transitory computer-readable storage medium storing instructions executable by the one or more computer processors to cause the one or more computer processors to perform operations. The operations include receiving a signal representing the condition from the sensor. The operations include comparing the signal representing the condition to the instructions. The operations include, responsive to the comparison of the signal representing the condition and the instructions, generating a command signal to operate the magnetic wheel sub-assembly or the well tool.

The assembly includes a power sub-assembly to supply power to the control sub-assembly and the well tool. In some implementations, where the power sub-assembly includes a turbine, the method further includes generating electrical power responsive to a wellbore fluid flow and suppling the power to the power sub-assembly to electrically power the control sub-assembly or the well tool.

The assembly includes a backup retrieval mechanism mechanically coupled to the body. The backup retrieval mechanism couples to a retrieval tool.

The method includes sensing a condition, transmitting a signal representing the condition to the control sub-assembly, comparing the condition to the instruction, and responsive to the comparison of the signal representing the condition and the instruction, generating a command signal to operate the magnetic wheel sub-assembly or the well tool by the control sub-assembly.

In some implementations, where the well tool includes a brush coupled to the tool connection, the method further includes brushing a surface of the wellbore with the brush to clean the surface of the wellbore.

In some implementations, the method further includes engaging the magnetic wheel sub-assemblies to the surface of the wellbore. In some implementations, the method further includes rotating the magnetic wheel sub-assemblies while engaged to the surface of the wellbore. In some implementations, the method further includes, responsive to rotating the magnetic wheel sub-assemblies, repositioning the wellbore maintenance and inspection assembly in the wellbore. In some implementations, the method further includes stopping rotating the plurality of magnetic wheel sub-assemblies.

In some implementations, the method further includes locking the magnetic wheel sub-assemblies. Locking the magnetic wheel sub-assemblies prevents rotation of the magnetic wheel sub-assemblies. In some implementations, the method further includes engaging the locked magnetic wheel sub-assemblies to the surface of the wellbore. In some implementations, the method further includes, responsive to engaging the locked magnetic wheel sub-assemblies to the surface of the wellbore, maintaining the position of the wellbore maintenance and inspection assembly in the wellbore. In some implementations, the method further includes disengaging the locked magnetic wheel sub-assemblies from the surface of the wellbore. In some implementations, the method further includes unlocking the magnetic wheel sub-assemblies. Unlocking the magnetic wheel sub-assemblies allows rotation of the magnetic wheel sub-assemblies.

In some implementations, where the condition is the dimension of the wellbore, the method further includes receiving, at the controller, a first dimension of the wellbore. The method further includes receiving, at the controller, a second dimension of the wellbore. The method further includes comparing, by the controller, the first dimension to the second dimension. The method further includes, responsive to the comparison of the first dimension of the wellbore to the second dimension of the wellbore, where the comparison indicates the wellbore narrowing, generating, by the controller, a command signal to reposition the magnetic wheel sub-assemblies relative to the body in response to the wellbore narrowing. The method further includes, where the comparison indicates the wellbore widening, generating, by the controller, a command signal to reposition the magnetic wheel sub-assemblies relative to the body in response to the wellbore widening.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

The present disclosure describes a system and a method for maintaining and inspecting a wellbore with a wellbore maintenance and inspection assembly. The assembly includes a body to be disposed in a wellbore. The assembly include a magnetic wheel assembly which includes multiple magnetic wheel sub-assemblies, each adjustably coupled to the body. The magnetic wheel assembly positions the body within the wellbore and repositions the magnetic wheel sub-assemblies relative to the body in response to a wellbore narrowing or a wellbore widening. The assembly includes a tool connection coupled to the body. The tool connection couples a well tool to the body.

The assembly includes a control sub-assembly coupled to the body, the magnetic wheel assembly, and the tool connection. The control sub-assembly controls the magnetic wheel assembly and operates the well tool within the wellbore. The assembly includes a power sub-assembly to supply power to the control sub-assembly and the well tool. The assembly includes a backup retrieval mechanism coupled to the body. The backup retrieval mechanism couples to a retrieval tool.

Implementations of the present disclosure realize one or more of the following advantages. Preventative and corrective maintenance on wellbore completion assembly components can be conducted a shorter time period. For example, a corroded or blocked tubular can be inspected and cleaned in a single operation. A tubular restriction can be navigated. The assembly can reduce its overall diameter to move through the tubular restriction. Multiple sizes of tubulars can be cleaned by the same wellbore maintenance and inspection assembly. For example, the assembly can actuate to maintain contact on tubulars of different inner diameters. Additionally, environmental safety is improved. For example, a wellbore containing tubulars of multiple sizes or with various internal restrictions can be inspected with a single wellbore maintenance and inspection assembly to insure component structural integrity and verify proper component operation. Ease of maintenance is improved as a workover rig or slickline logging tool surface equipment is not needed. The assembly is disposed in the wellbore without the workover rig or slickline logging tool surface equipment. For an offshore wellbore, a support barge is not needed. Also, the wellbore tubular and components can be maintained or inspected axially (in multiple directions) within the without surface interference, or in other words, the assembly operates autonomously or semi-autonomously. Retrieval of a wellbore maintenance and inspection assembly is simplified. For example, the assembly self-retrieves from the wellbore. A drilling rig or workover rig is not needed for assembly retrieval operations.

Figure 1:
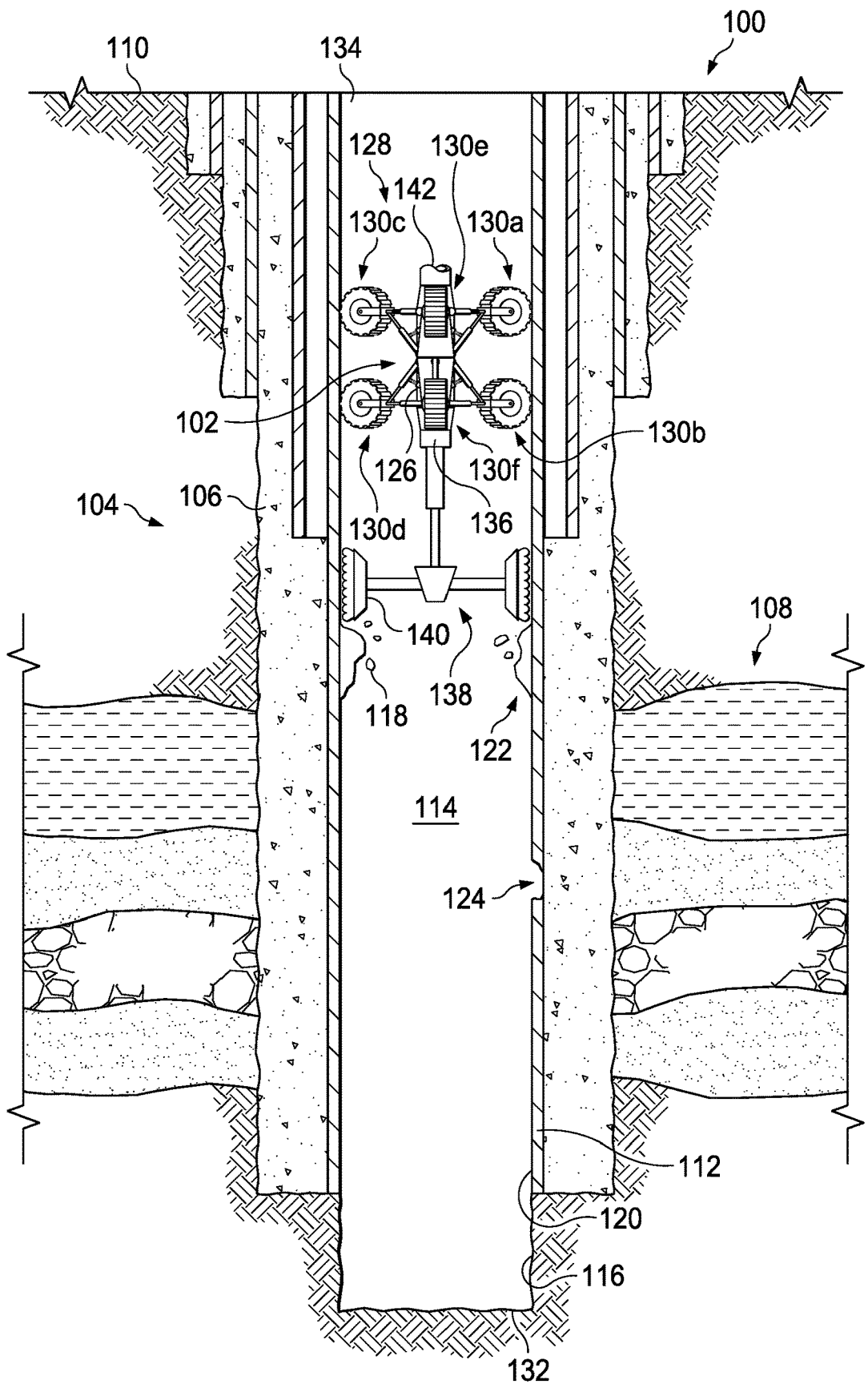
FIG. 1 is a schematic view of a wellbore maintenance and inspection assembly disposed in a wellbore.

FIG. 1 is a schematic view of a wellbore maintenance and inspection assembly disposed in a wellbore. The wellbore maintenance and inspection assembly 102 is disposed in a wellbore 104 to perform a maintenance or inspection task (or operation). The wellbore 104 is defined by a wellbore surface 106 which separates the wellbore from the formations 108 of the Earth. The wellbore 104 extends into the formations 108 of the Earth from a surface 110 of the Earth. The formations 108 of the Earth contain pressurized liquid and gaseous phases of various fluids and chemicals including water, oils, and hydrocarbon gases. The wellbore 104 includes a casing 112 to seal portions 114 of the wellbore 104 from the formations 108 of the Earth and to control the flow of oil and gas from other portions 116 of the wellbore 104 to the surface 110 of the Earth. As shown in FIG. 1, the portion 116, in this case at the bottom or downhole end of the casing 112, is open to allow pressurized liquid and gaseous phases of various fluids and chemicals including water, oils, and hydrocarbon gases from the formations 108 to flow into the casing 112 and up to the surface 110 of the Earth. The wellbore 104 can include other components such as isolation valves, inflow control valves, tubing, tubing joints, pumps, electrical submersible pumps, liners, branches, and shoes (not shown) to control the flow of the water, oils, and hydrocarbon gases to the surface 110.

The pressurized liquid and gaseous phases of various fluids and chemicals including water, oils, and hydrocarbon gases contain particulates and debris 118 can adhere to an inner surface 120 of the casing 112. The particulates and debris 118 accumulate on the inner surface 120 of the casing 112 and cause a restriction 122 in water, oils, and hydrocarbon gas flow to the surface 110 of the Earth. Additionally, some of the gases, fluids, and chemicals are corrosive to wellbore components. The corrosive gases, fluids and chemicals can cause corrosion which accumulates to contribute to the restriction 122 or cause component failure. For example, an accumulation of corrosion on a valve (not shown) can result in the valve failing to open or shut properly. The wellbore maintenance and inspection assembly 102 can be configured to remove the restriction 122 by cleaning the inner surface 120 of the casing 112. Alternatively, the corrosive gases, fluids, and chemicals eat away a portion of the wellbore components. For example, a portion 124 of the casing 112 can be eaten away or removed by the corrosive gases, fluids, and chemicals. Removal of the portion 124 of the casing 112 can compromise the structural integrity of the wellbore 104 or the casing 112. The assembly 102 can be configured to inspect the inner surface 120 of the casing 112.

Figure 2:
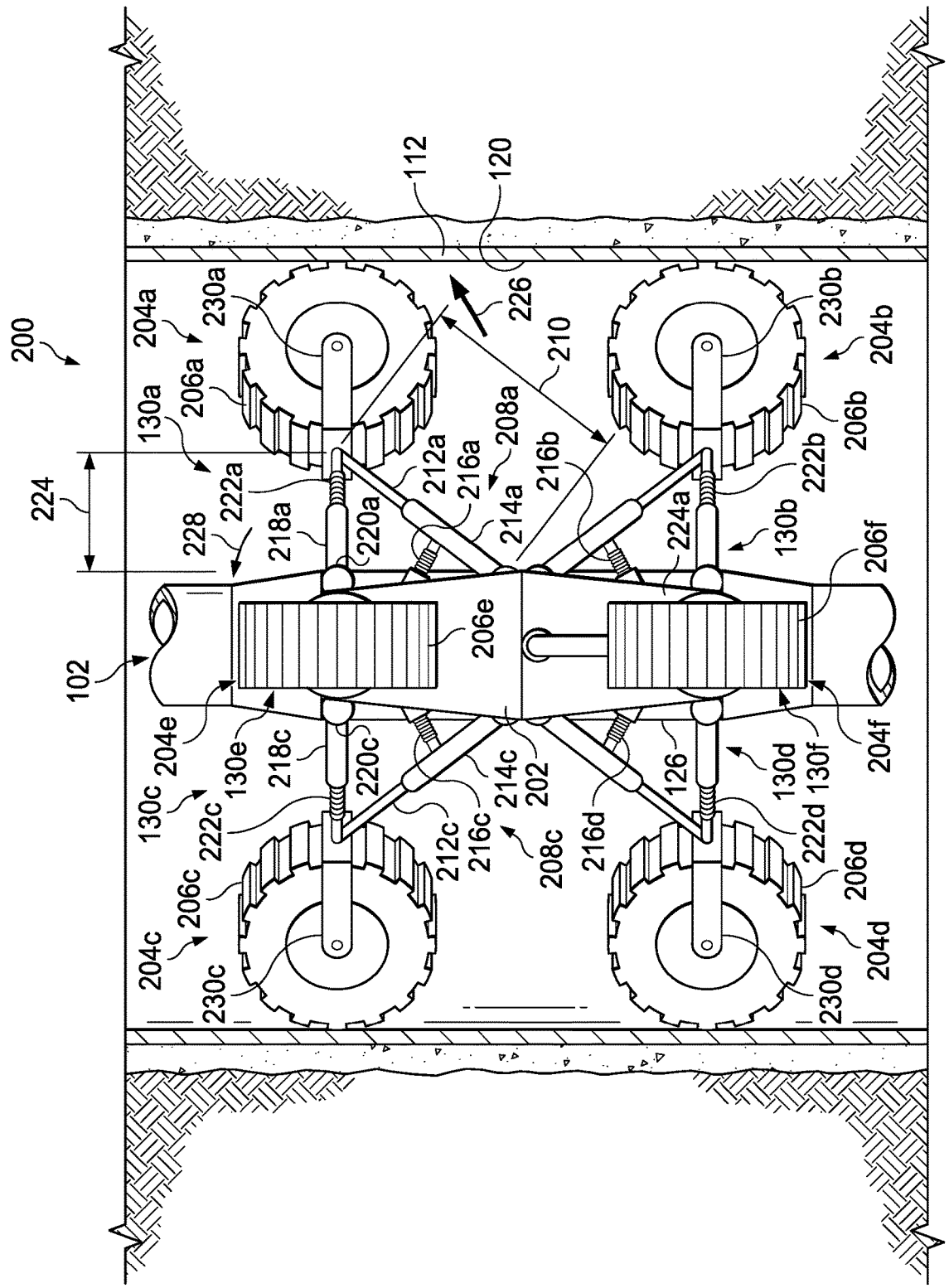
FIG. 2 is a schematic side view of the wellbore maintenance and inspection assembly of FIG. 1 engaged to the wellbore.
Figure 3:
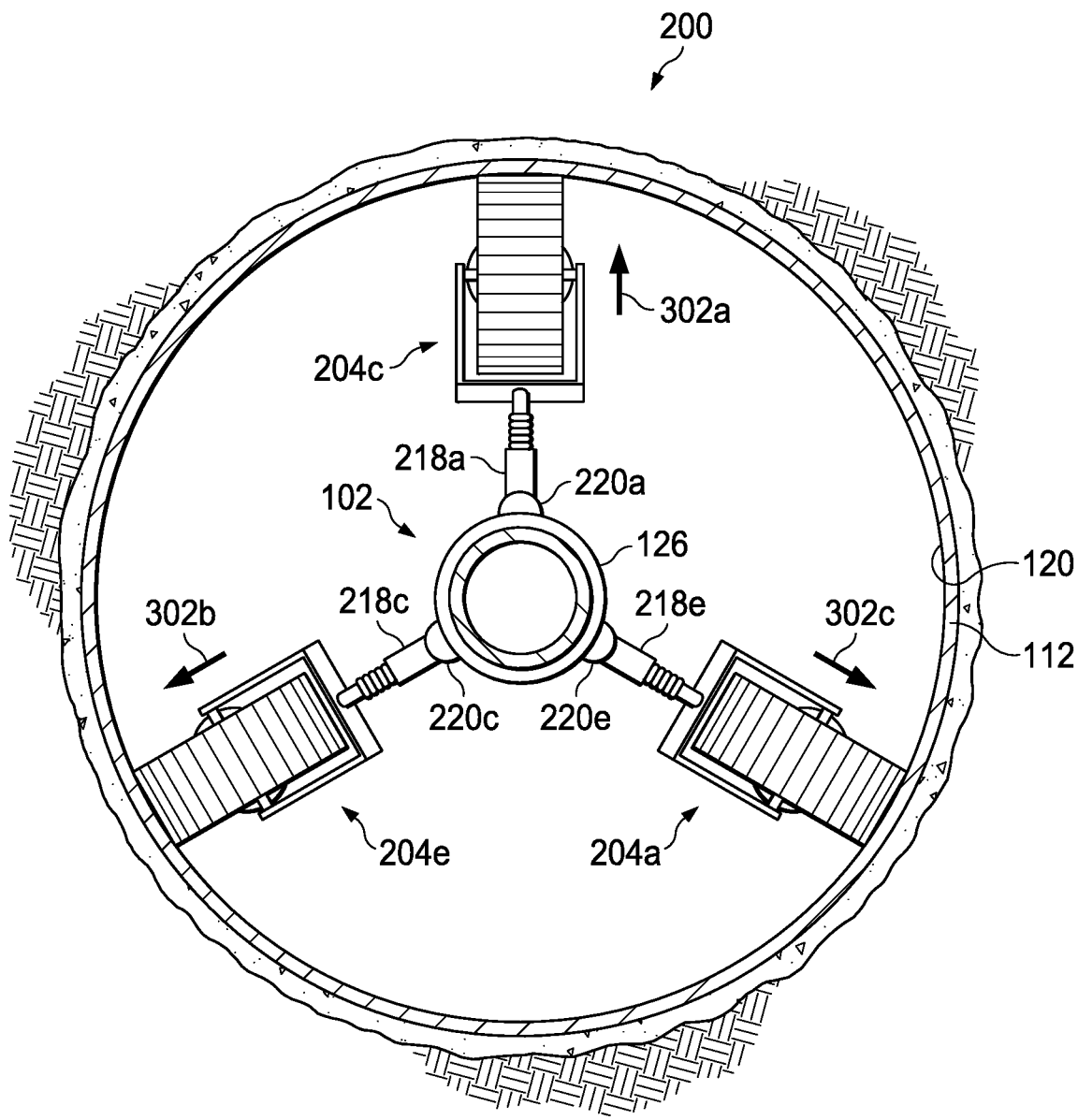
FIG. 3 is a schematic top view of the wellbore maintenance and inspection assembly of FIG. 1 engaged to the wellbore.

The assembly 102 includes a body 126. The body 126 is disposed in the wellbore 104. FIG. 2 is a schematic side view of the wellbore maintenance and inspection assembly of FIG. 1 engaged to the wellbore. FIG. 3 is a schematic top view of the wellbore maintenance and inspection assembly of FIG. 1 engaged to the wellbore. Referring to FIG. 3, the body 126 is a hollow, generally cylindrical metal tube. In some cases, the body can include multiple sections (not shown) which articulate as the assembly 102 traverses through the wellbore 104. Referring to FIG. 2, the body 126 has an outside surface 202 that can have portions (for example portions 224a and 224b). The portion 224a can be flat. Two portions (224a and 224b) can be at angles to each other. The body 126 is a structural member of the assembly 102. The body 126 contains, seals, and protects multiple components (described later) from downhole wellbore conditions, such as pressure and temperature.

Figure 6:
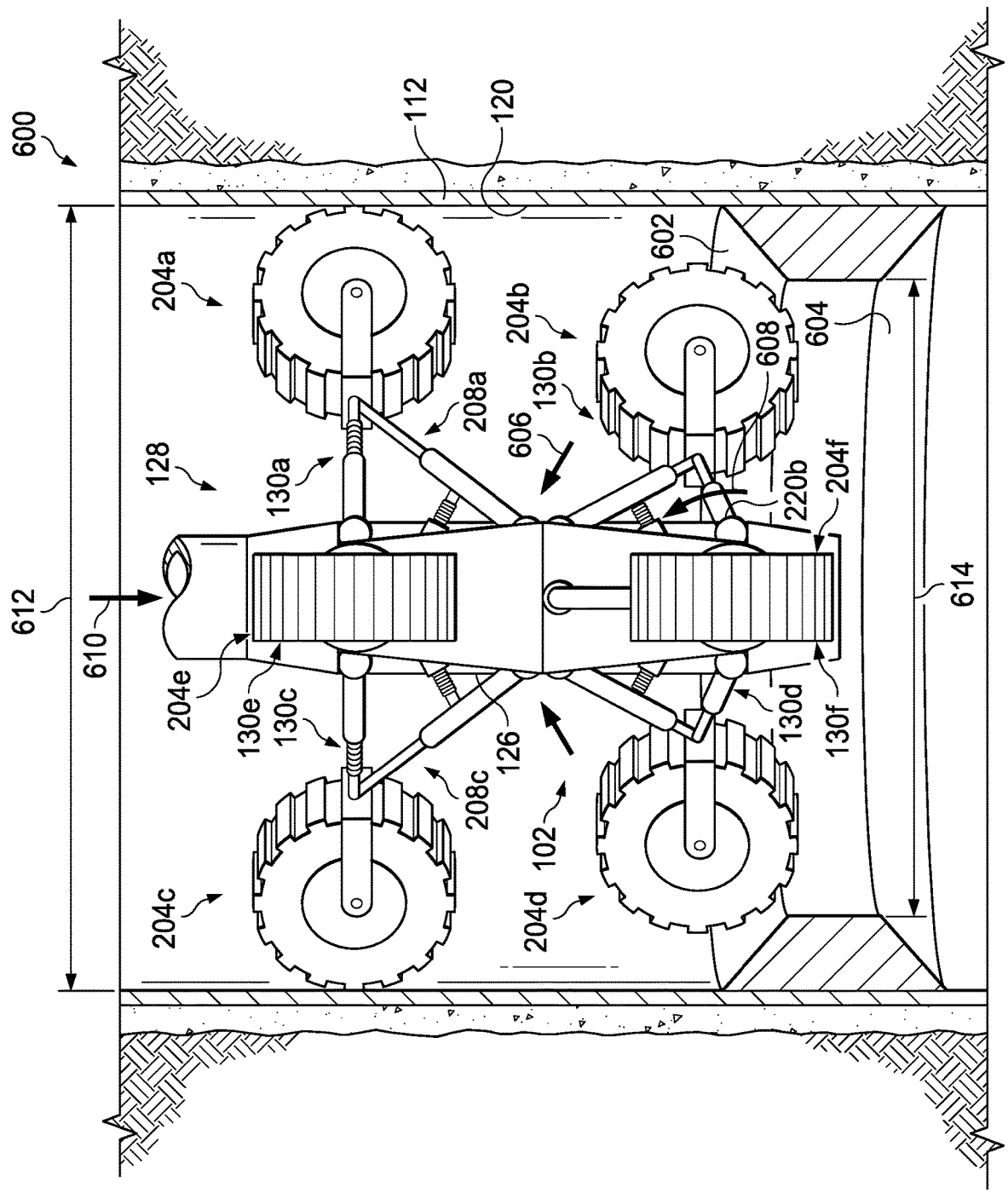
FIG. 6 is a schematic view of the wellbore maintenance and inspection assembly of FIG. 1 moving through a restriction in the wellbore.

Referring to FIGS. 1-3, a magnetic wheel assembly 128 is coupled to the outside surface 202 of the body 126. The magnetic wheel assembly 128 includes multiple magnetic wheel sub-assemblies 130a, 130b, 130c, 130d, 130e, and 130f adjustably coupled to the body 126. In some cases, the magnetic wheel assembly 128 can include fewer or more magnetic wheel sub-assemblies. For example, the magnetic wheel assembly 128 can include two, three, four, five, eight, nine, ten, or twelve more magnetic wheel sub-assemblies. The magnetic wheel assembly 128 positions the body 126 within the wellbore 104. FIG. 6 is a schematic view of the wellbore maintenance and inspection assembly of FIG. 1 moving through a restriction in the wellbore. Referring to FIG. 6, the magnetic wheel assembly 128 also repositions the magnetic wheel sub-assemblies 130a-f relative to the body 126 in response to a wellbore narrowing 602 or a wellbore widening 604 as described later.

Figure 4:
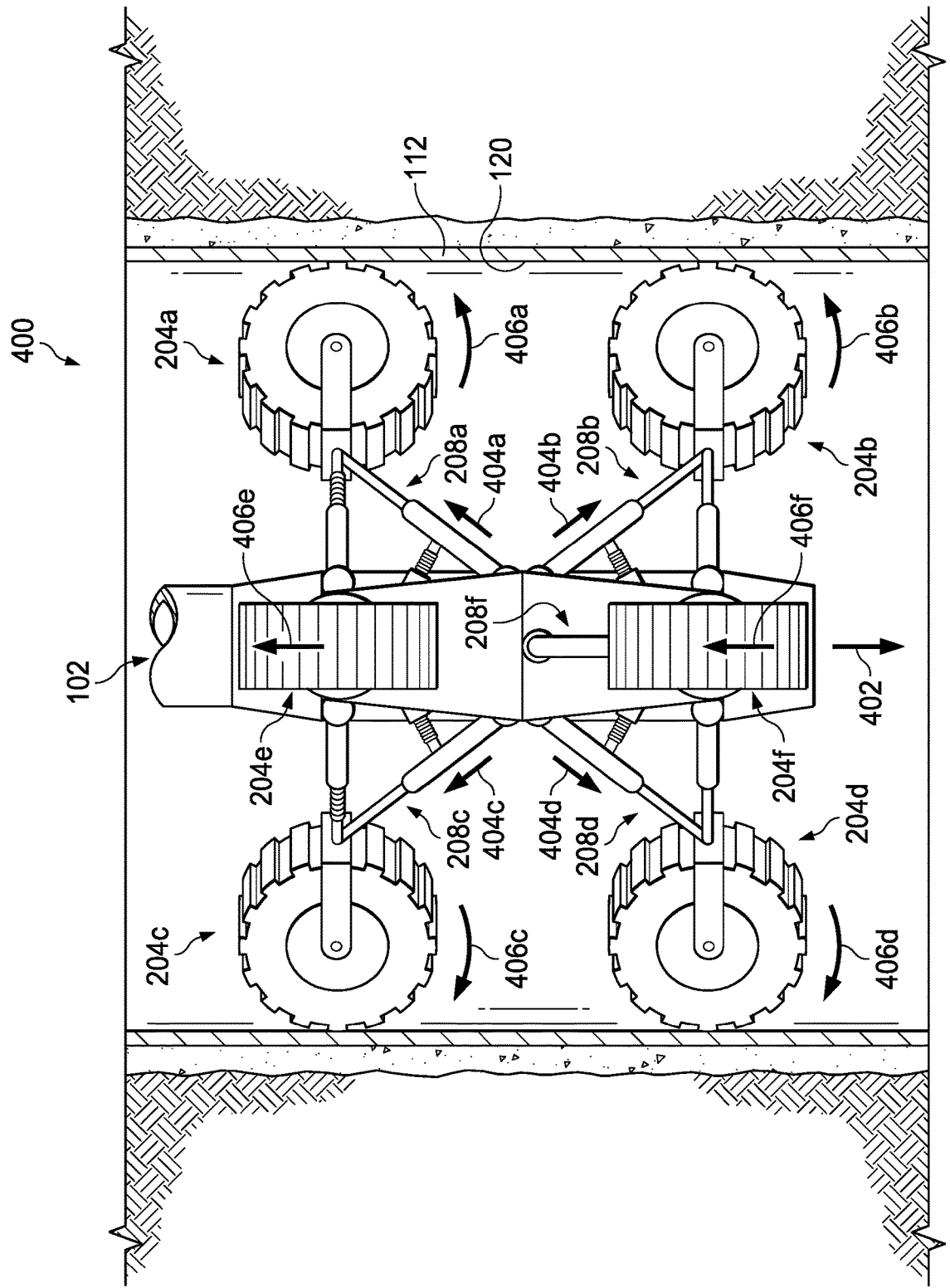
FIG. 4 is a schematic side view of the wellbore maintenance and inspection assembly moving through the wellbore in a downhole direction.
Figure 5:
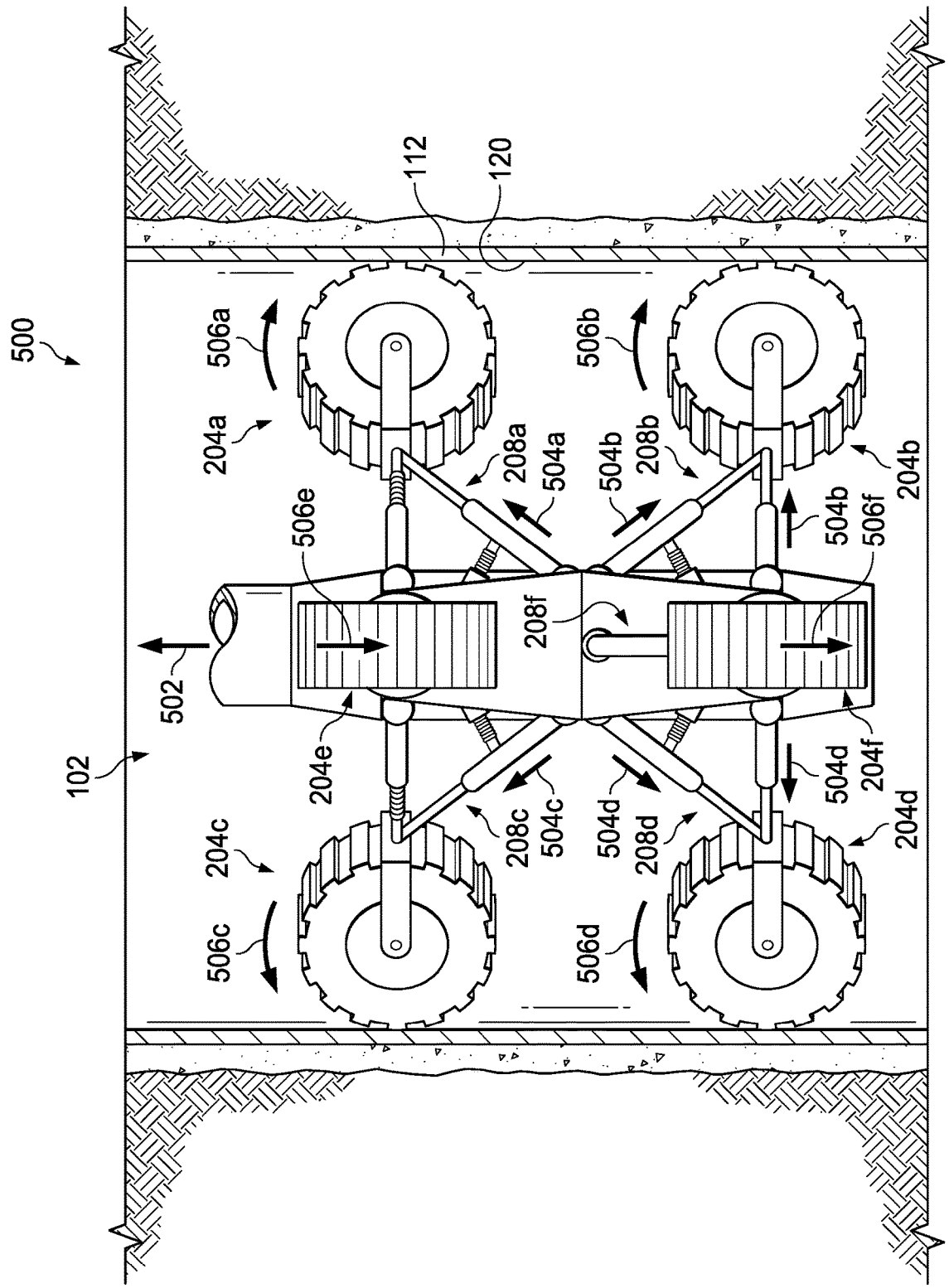
FIG. 5 is a schematic view of the wellbore maintenance and inspection assembly moving through the wellbore in an uphole direction.

FIG. 4 is a schematic side view of the wellbore maintenance and inspection assembly of FIG. 1 moving through the wellbore. FIG. 5 is a schematic view of the wellbore maintenance and inspection assembly of FIG. 1 in a retrieval mode in the wellbore. Referring to FIGS. 2-7, each of the magnetic wheel sub-assemblies 130a-f include a respective magnetic wheel 204a-f to couple to the inner surface 120 of the casing 112. Each magnetic wheel 204a-f includes a respective magnet (not shown) which adheres to the casing 112. As each magnetic wheel 204a-f rotates to move the assembly 102 in the casing 112, the magnetic force from the respective magnet coupled to the casing 112 couples the respective magnetic wheel 204a-f to the inner surface 120 of the casing 112. As shown in FIG. 2, each magnetic wheel 204a-f include a textured or corrugated outer surface 206a-f to further couple each magnetic wheel 204a-f to the inner surface 120 of the casing 112.

The magnetic wheel sub-assembly 130a includes a hydraulic arm 208a coupled to the magnetic wheel 204a and the body 126. The hydraulic arm 208a positions the magnetic wheel 204a in contact with the inner surface 120 of the casing 112. The hydraulic arm 208a changes in a length 210 to move the magnetic wheel 204a relative to the body 126 and engage or disengage from the inner surface 120 of the casing 112. The hydraulic arm 208a includes a hydraulic piston rod 212a coupled to the magnetic wheel 204a. The hydraulic piston rod 212a moves inside a hydraulic cylinder 214a when operated by a hydraulic piston (not shown) contained within the hydraulic cylinder 214.

The magnetic wheel 204a is mechanically and electrically coupled to the hydraulic arm 208a and the hydraulic piston rod 212a by a suspension fork 230a. The suspension fork 230a transfers power from a drive spring arm 218a, described below, to the magnetic wheel 204a.

The magnetic wheel sub-assemblies 130b-f each include a hydraulic arm, a hydraulic piston rod, a hydraulic cylinder, and a hydraulic piston substantially similar to the hydraulic arm 208a, the hydraulic piston rod 212a, the hydraulic cylinder 214a, and the hydraulic piston (not shown) previously discussed. The magnetic wheel sub-assembly 130b includes a hydraulic arm 208b, a hydraulic piston rod 212b, a hydraulic cylinder 214b, and a hydraulic piston (not shown). The magnetic wheel sub-assembly 130c includes a hydraulic arm 208c, a hydraulic piston rod 212c, a hydraulic cylinder 214c, and a hydraulic piston (not shown). The magnetic wheel sub-assembly 130d includes a hydraulic arm 208d, a hydraulic piston rod 212d, a hydraulic cylinder 214d, and a hydraulic piston (not shown). The magnetic wheel sub-assembly 130e includes a hydraulic arm (not shown), a hydraulic piston rod (not shown), a hydraulic cylinder (not shown), and a hydraulic piston (not shown). The magnetic wheel sub-assembly 130f includes a hydraulic arm 208f, a hydraulic piston rod 212f, a hydraulic cylinder 214f, and a hydraulic piston (not shown).

The magnetic wheel sub-assembly 130a includes a support arm 216a coupled to hydraulic arm 208a and the body 126 to support the hydraulic arm 208a. The support arm 216a provides structural rigidity to the hydraulic arm 208a. The support arm 216a is a movable mechanism with a knuckle joint (not shown) to allow the support arm 216a to move laterally and adjust according to the casing 112 dimensions as described later in reference to FIG. 6. The telescopic nature of support arms allow the support arms 216 to extend or retract to access smaller inner diameter wellbores 112 as described in reference to FIG. 6 or hold in position as described in reference to FIG. 7. The magnetic wheel sub-assemblies 130b-f each include a support arm substantially similar to support arm 216. The magnetic wheel sub-assembly 130b includes a support arm 216b. The magnetic wheel sub-assembly 130c includes a support arm 216c. The magnetic wheel sub-assembly 130d includes a support arm 216d. The magnetic wheel sub-assembly 130e includes a support arm (not shown). The magnetic wheel sub-assembly 130f includes a support arm (not shown).

The magnetic wheel sub-assembly 130a includes a drive spring arm 218a coupled to the magnetic wheel 204a and the body 126. The drive spring arm 218a is coupled to the body 126 by a pivot joint 220a. The pivot joint 220a allows the drive spring arm 218a to articulate in response to a change in the length 210 of the hydraulic arm 208a. The drive spring arm 218a is coupled to the magnetic wheel 204a by a spring assembly 222a. The spring assembly 222a adjusts an overall length 224 of the drive spring arm 218a in response to a change in the overall length of the hydraulic arm 208a. The drive spring arm 218a includes a geared drive mechanism (not shown) similar to a tractor shaft, to operate the magnetic wheel 204a, causing the magnetic wheel 204a to rotate.

The magnetic wheel sub-assemblies 130b-f each include a drive spring arm, pivot joint, spring assembly, and geared drive mechanism substantially similar to the drive spring arm 218a, pivot joint 220a, spring assembly 222a, and geared drive mechanism (not shown) previously discussed. The magnetic wheel sub-assembly 130b includes a drive spring arm 218b, pivot joint 220b, spring assembly 222b, and geared drive mechanism (not shown). The magnetic wheel sub-assembly 130c includes a drive spring arm 218c, pivot joint 220c, spring assembly 222c, and geared drive mechanism (not shown). The magnetic wheel sub-assembly 130d includes a drive spring arm 218d, pivot joint 220d, spring assembly 222d, and geared drive mechanism (not shown). The magnetic wheel sub-assembly 130e includes a drive spring arm (not shown), pivot joint (not shown), spring assembly (not shown), and geared drive mechanism (not shown). The magnetic wheel sub-assembly 130f includes a drive spring arm 218f, pivot joint 220f, spring assembly (not shown), and geared drive mechanism (not shown).

Figure 15:
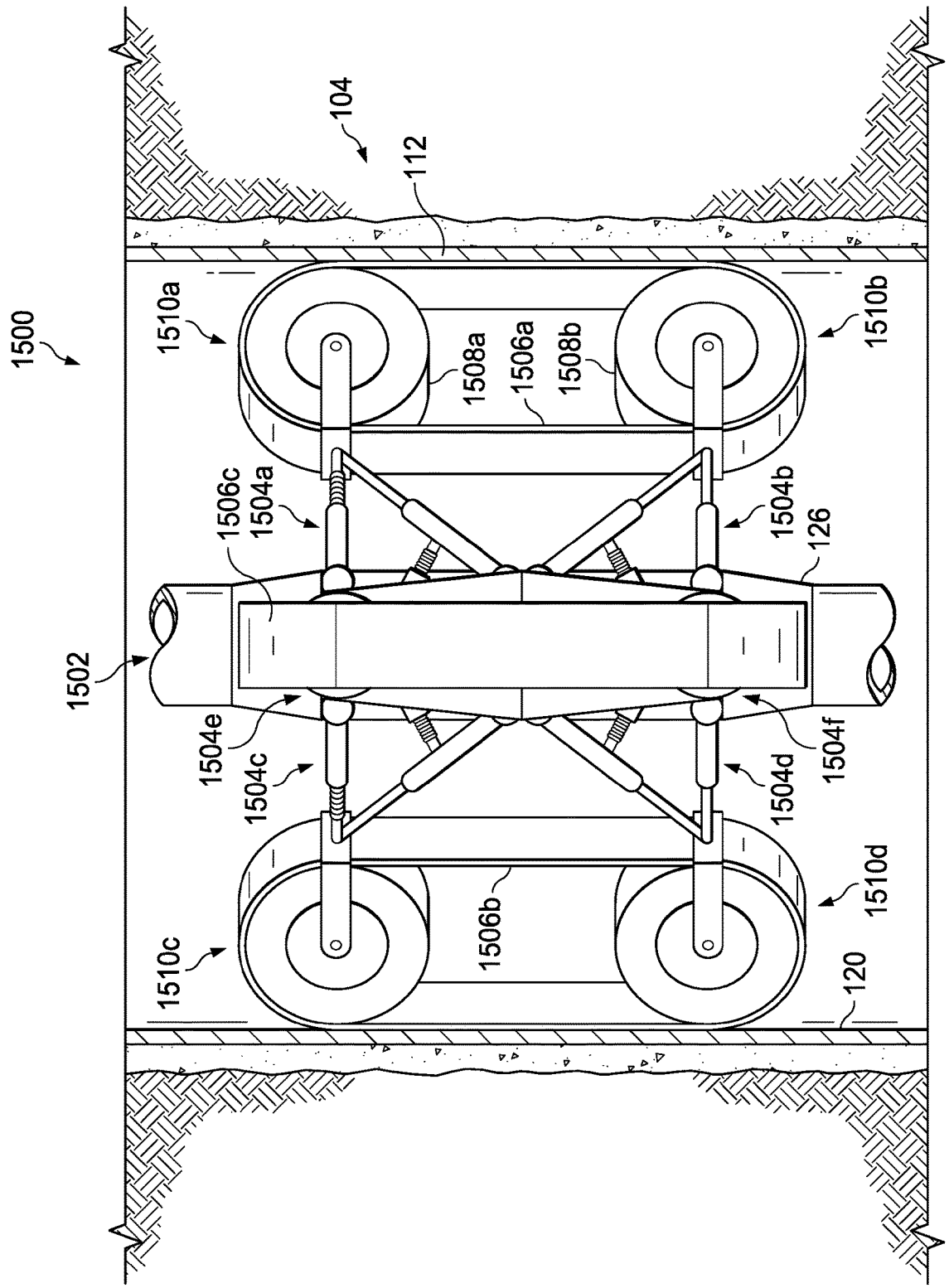
FIG. 15 is a schematic view of another wellbore maintenance and inspection assembly disposed in a wellbore.

FIG. 15 is a schematic view of another wellbore maintenance and inspection assembly 1500 disposed in the wellbore 104. Referring to FIG. 15, the wellbore maintenance and inspection assembly 1500 is generally similar to the wellbore maintenance and inspection assembly 102 previously described. The wellbore maintenance and inspection assembly 1500 is positioned in the wellbore 104. The wellbore maintenance and inspection assembly 102 is magnetically coupled to the inner surface 120 of the casing 112 by a magnetic wheel assembly 1502 coupled to the outside surface 202 of the body 126.

The magnetic wheel assembly 1502 is generally similar to the magnetic wheel assembly 128 previously described. The magnetic wheel assembly 1502 includes multiple magnetic wheel sub-assemblies 1504a, 1504b, 1504c, 1504d, 1504e, and 1504f adjustably coupled to the body 126. In some cases, the magnetic wheel assembly 128 can include fewer or more magnetic wheel sub-assemblies. For example, the magnetic wheel assembly 128 can include two, three, four, five, eight, nine, ten, or twelve more magnetic wheel sub-assemblies. The magnetic wheel assembly 128 positions the body 126 within the wellbore 104. Substantially similarly functionally to the magnetic wheel assembly 128, as described in respect to FIG. 6, the magnetic wheel assembly 1502 also repositions the magnetic wheel sub-assemblies 1504a-f relative to the body 126 in response to a wellbore narrowing 602 or a wellbore widening 604 as described later.

Referring to FIG. 15, each of the magnetic wheel sub-assemblies 1504a-f are substantially similar to the magnetic wheel sub-assemblies 130a-f described previously. A first chain 1506a is mechanically and magnetically coupled to a first pair of magnetic wheel sub-assemblies 1504a and 1504b. The first chain 1506a is mechanically coupled to an outside surface 1508a of a first magnetic wheel 1510a of the first magnetic wheel sub-assembly 1504a and an outside surface 1508b of a second magnetic wheel 1510b of the second magnetic wheel sub-assembly 1504b. The first chain 1506a is magnetically coupled to the first pair of magnetic wheel sub-assemblies 1504a and 1504b which increases an overall surface area of contact between the magnetic wheel assembly 1502 and 120 of the casing 112 that the first magnetic wheel 204a and the second magnetic wheel 204b alone, increasing the wellbore maintenance and inspection assembly's 1500 engagement to the inner surface 120 and control and maneuverability in the wellbore 104.

A second chain 1506b is mechanically and magnetically coupled to a second pair of magnetic wheel sub-assemblies 1504c and 1504d. A third chain 1506c is mechanically and magnetically coupled to a third pair of magnetic wheel sub-assemblies 1504e and 1504f. The second chain 1506b and the third chain 1506c are substantially similar to the first chain 1506a previously described. Otherwise, the magnetic wheel assembly 1502 is substantially similar to the magnetic wheel assembly 128 previously described.

Figure 8:
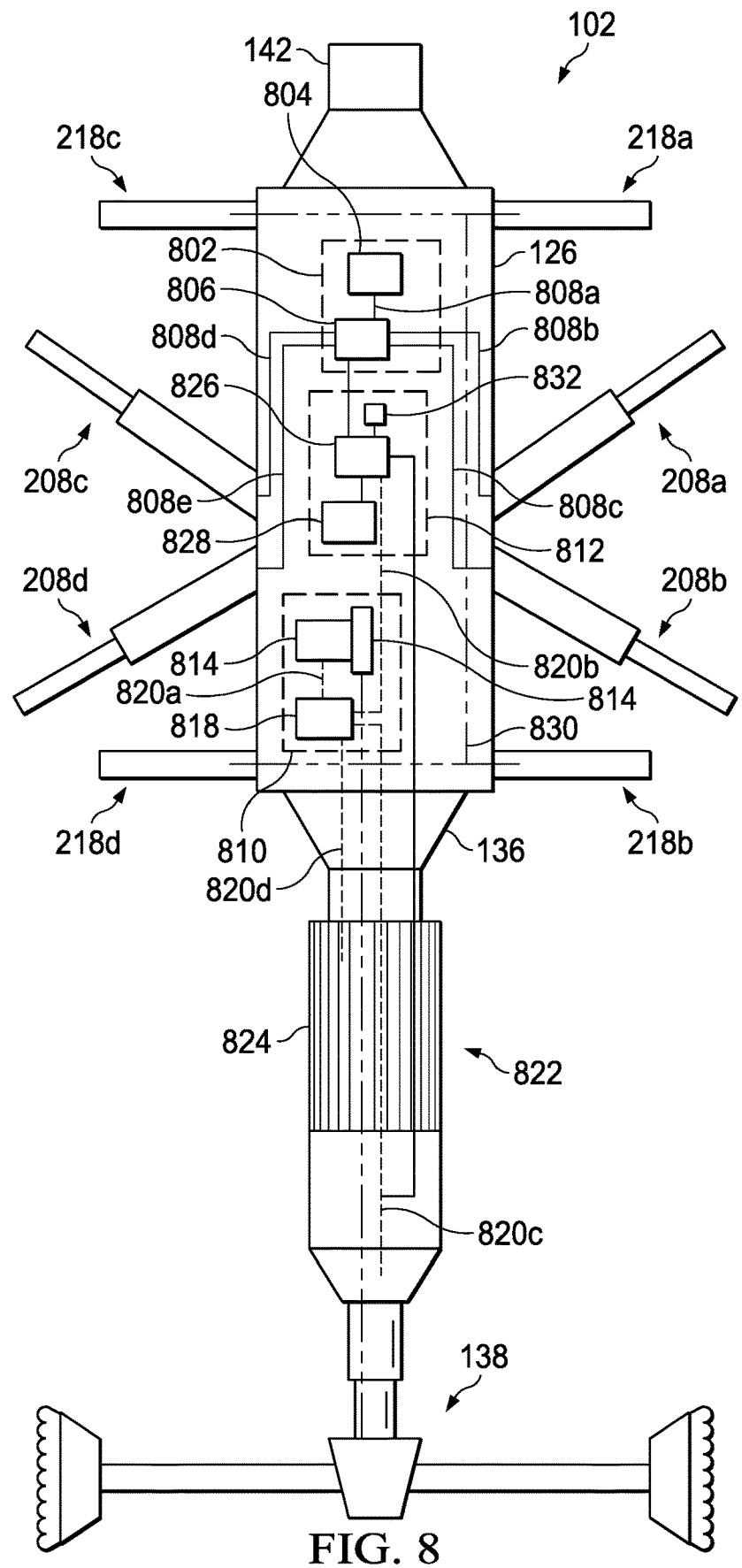
FIG. 8 is a schematic view of the hydraulic, power, and control sub-assemblies of the wellbore maintenance and inspection assembly.

FIG. 8 is a schematic view of the hydraulic, power, and control sub-assemblies of the wellbore maintenance and inspection assembly. Referring to FIG. 8, a hydraulic sub-assembly 802 is coupled to and positioned within the body 126. The hydraulic sub-assembly 802 supplies and controls the flow a hydraulic fluid to and from each of the magnetic wheel sub-assemblies 130a-f to control the respective hydraulic arms 208a-f. The hydraulic sub-assembly 802 includes a hydraulic fluid supply reservoir 804. The hydraulic fluid supply reservoir 804 is a pressure vessel which contains a hydraulic fluid to flow to and from each of the magnetic wheel sub-assemblies 130a-f to control the respective hydraulic arms 208a-f. The hydraulic fluid supply reservoir 804 can be pressurized, for example with a pump, a piston, or a nitrogen cylinder.

The hydraulic sub-assembly 802 includes a hydraulic valve 806. The hydraulic valve 806 controls the fluid flow to and from the hydraulic fluid supply reservoir 804 through multiple hydraulic conduits to each of the magnetic wheel sub-assemblies 130a-f. A first hydraulic conduit 808a fluidically connects the hydraulic fluid supply reservoir 804 to the hydraulic valve 806. A second hydraulic conduit 808b fluidically connects the hydraulic valve 806 to the hydraulic arm 208a. A third hydraulic conduit 808c fluidically connects the hydraulic valve 806 to the hydraulic arm 208b. A fourth hydraulic conduit 808d fluidically connects the hydraulic valve 806 to the hydraulic arm 208c. A fifth hydraulic conduit 808e fluidically connects the hydraulic valve 806 to the hydraulic arm 208d. A sixth hydraulic conduit (not shown) fluidically connects the hydraulic valve 806 to the hydraulic arm 208e (shown in FIGS. 2-8). A seventh hydraulic conduit (not shown) fluidically connects the hydraulic valve 806 to the hydraulic arm 208f (shown in FIGS. 2-8).

Referring to FIGS. 2, 3, and 8, the hydraulic valve 806 actuates to supply hydraulic fluid from the hydraulic fluid supply reservoir 804 to each of the hydraulic arms 208a-f. As described in reference to hydraulic arm 208a, supplying the hydraulic fluid to the hydraulic arm 208a extends the length 210 of hydraulic arm 208a. Supplying hydraulic fluid to hydraulic arms 208a pressurizes hydraulic cylinder 214a and forces the hydraulic piston (not shown) to move hydraulic piston rod 212a in the direction of arrow 226. Moving the hydraulic piston rod 212a in the direction of arrow 226 engages the magnetic wheel 204a to the inner surface 120 of the casing 112. Additionally, in response to the hydraulic piston rod 212a extending in the direction of arrow 226 to engage the magnetic wheel 204a to the inner surface 120, the hydraulic arm 208a rotates about the pivot joint 220a in the direction of arrow 228 to maintain proper alignment of the magnetic wheel 204a with respect to the inner surface 120. Each of the remaining hydraulic arms 208b-f extend substantially similar to extending the hydraulic arm 208a. Referring to FIG. 3, the drive spring arms 218a, 218c, and 218e are rotated about pivot joints 220a, 220c, and 220e to engage the magnetic wheels 204a, 204c, and 204e to the inner surface 120 of the casing 112 in the direction of arrows 302a, 302b, and 302c, respectively. One or more of magnetic wheel sub-assemblies 130a-f can be extended individual or a group, sequentially or simultaneously, to engage the inner surface 120 of the casing 112.

Referring to FIGS. 2, 6, and 8, in a similar manner to extending the hydraulic arms 208a-f, the hydraulic arms 208a-f are retracted to disengage from the inner surface 120 of the casing 112. As described in reference to hydraulic arm 208b, flowing the hydraulic fluid to the hydraulic arm 208b shortens the length 210 of hydraulic arm 208b. Flowing the hydraulic fluid to hydraulic arm 208b to an opposite side of the hydraulic piston (not shown) pressurizes the opposite side of the hydraulic cylinder 214b and forces the hydraulic piston (not shown) to move hydraulic piston rod 212b in the direction of arrow 606 (as shown in FIG. 6). Moving the hydraulic piston rod 212b in the direction of arrow 606 disengages the second magnetic wheel 204b to the inner surface 120 of the casing 112. Additionally, in response to the hydraulic piston rod 212b retracting in the direction of arrow 606 to disengage the second magnetic wheel 204b from the inner surface 120, the hydraulic arm 208b rotates about the pivot joint 220b in the direction of arrow 608 to maintain proper alignment of the second magnetic wheel 204*b* with respect to the inner surface 120. Each of the remaining hydraulic arms 208*a* and 208*c-f* retract substantially similar to retracting the hydraulic arm 208*b*. One or more of magnetic wheel sub-assemblies 130*a-f* can be retracted individual or i a group, sequentially or simultaneously, to disengage from the inner surface 120 of the casing 112.

Referring to FIG. 6, as the assembly 102 moves through the casing in the direction of arrow 610, a set of magnetic wheel sub-assemblies 130*b*, 130*d*, and 130*f* actuate to maintain contact with the inner surface 120 when the inner surface is 120 changes, such as with the wellbore narrowing 602 or the wellbore widening 604. The set of magnetic wheel sub-assemblies 130*b*, 130*d*, and 130*f* can actuate partially or completely depending on the degree to which the wellbore narrows or widens. A second set of magnetic wheel sub-assemblies 130*a*, 130*c*, and 130*e* can likewise actuate partially or completely to maintain contact with the inner surface 120. In the same manner, while moving opposite to the direction of arrow 310, the magnetic wheel sub-assemblies 130*a-f* can actuate to maintain contact with the inner surface 120 when the inner surface 120 changes, such as with the wellbore narrowing 602 or the wellbore widening 604.

FIG. 4 is a schematic side view of the wellbore maintenance and inspection assembly moving through the wellbore in a downhole direction. The downhole direction is indicated by the arrow 402. Referring to FIG. 1, the downhole direction is from an opening 134 on the surface 110 of the Earth towards a bottom 132 of the wellbore 104. In a vertical well or vertical portion of a well, the downhole direction is downward from the surface 110 of the Earth. However, in a lateral wellbore, the downhole direction may be in a lateral direction. The hydraulic arms 208*a-f* are extended from the assembly 102 to contact the inner surface 120 of the casing 112. Hydraulic arm 208*a* is fully extended in the direction of arrow 404*a*. Hydraulic arm 208*b* is fully extended in the direction of arrow 404*b*. Hydraulic arm 208*c* is fully extended in the direction of arrow 404*c*. Hydraulic arm 208*d* is fully extended in the direction of arrow 404*d*. Hydraulic arm 208*e* (not shown) is fully extended. Hydraulic arm 208*f* is fully extended. The magnetic wheels 204*a-f* rotate in the direction of arrows 406*a-f*, respectively, to move the assembly 102 in the downward direction (arrow 402) in the casing 112. This can be referred to as a running mode.

FIG. 5 is a schematic view of the wellbore maintenance and inspection assembly moving through the wellbore in an uphole direction. The uphole direction is indicated by arrow 502. Referring to FIG. 1, the uphole direction is from the bottom 132 of the wellbore 104 towards the opening 134 on the surface 110 of the Earth. In a vertical well or vertical portion of a well, the uphole direction is toward the surface 110 of the Earth. However, in a lateral wellbore, the uphole direction may be in a lateral direction. The hydraulic arms 208*a-f* of the assembly 102 are extended to contact the inner surface 120 of the casing 112. Hydraulic arm 208*a* is fully extended in the direction of arrow 504*a*. Hydraulic arm 208*b* is fully extended in the direction of arrow 504*b*. Hydraulic arm 208*c* is fully extended in the direction of arrow 504*c*. Hydraulic arm 208*d* is fully extended in the direction of arrow 504*d*. Hydraulic arm 208*e* (not shown) is fully extended. Hydraulic arm 208*f* is fully extended. The magnetic wheels 204*a-f* rotate in the direction of arrows 506*a-f* respectively, to move the assembly 102 in the downward direction (arrow 502) in the casing 112. This can be referred to as a retrieval mode.

Figure 7:
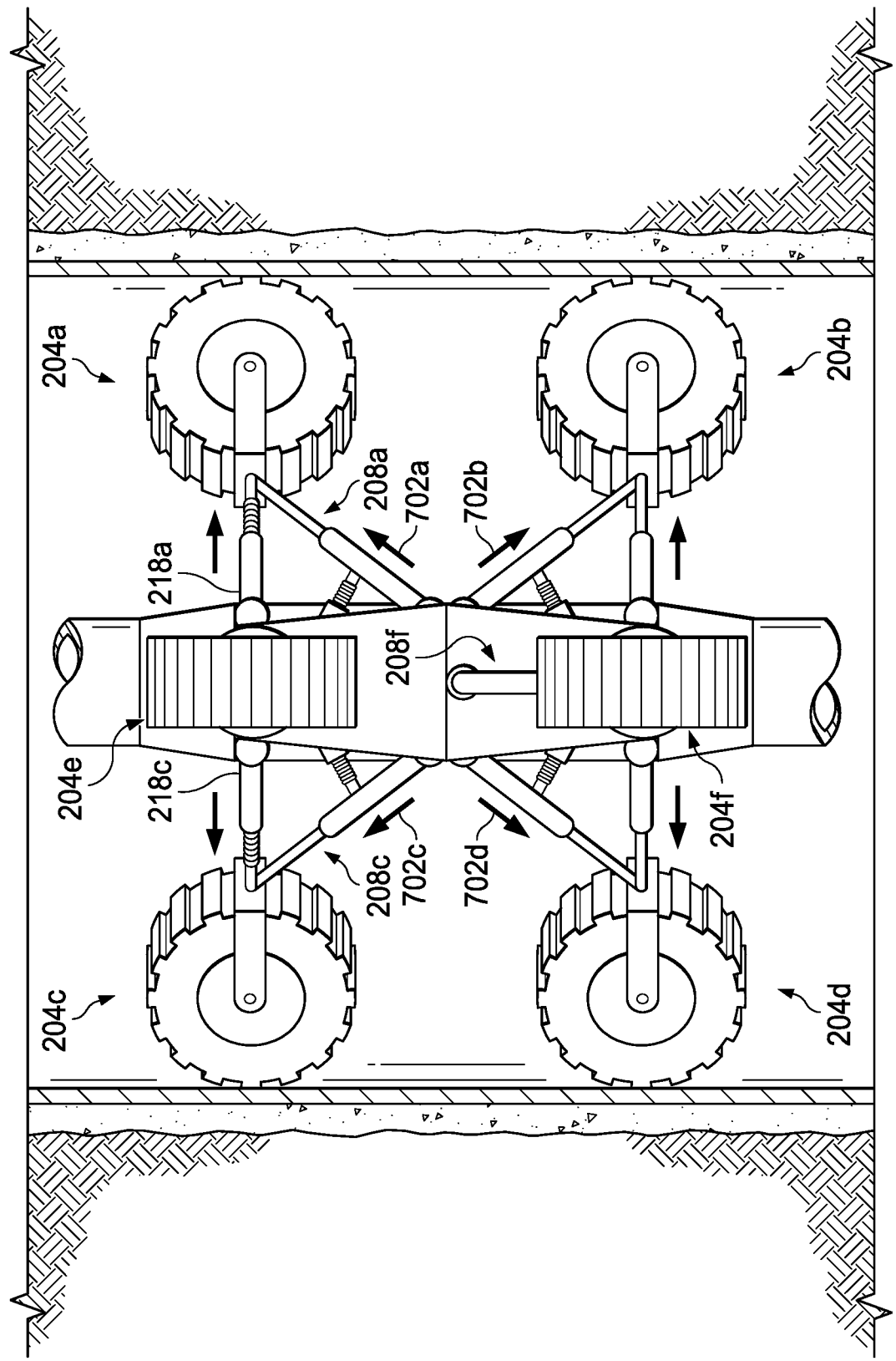
FIG. 7 is a schematic view of the wellbore maintenance and inspection assembly of FIG. 1 statically engaged to the wellbore.

FIG. 7 is a schematic view of the wellbore maintenance and inspection assembly of FIG. 1 statically engaged to the wellbore. Referring to FIG. 7, the hydraulic arms 208*a-f* of the assembly 102 are extended to contact the inner surface 120 of the casing 112. Hydraulic arm 208*a* is fully extended in the direction of arrow 702*a*. Hydraulic arm 208*b* is fully extended in the direction of arrow 702*b*. Hydraulic arm 208*c* is fully extended in the direction of arrow 702*c*. Hydraulic arm 208*d* is fully extended in the direction of arrow 702*d*. Hydraulic arm 208*e* (not shown) is fully extended. Hydraulic arm 208*f* is fully extended. The magnetic wheels 204*a-f* are not rotating. The magnetic wheels 204*a-f* are held engaged to the inner surface 120 of the casing 112. This can be referred to as a static mode. The magnetic wheels 204*a-f* are held engaged to the inner surface 120 of the casing 112 when a maintenance task or inspection of a time duration is conducted. For example, the magnetic wheels 204*a-f* can be held engaged to the inner surface 120 for five seconds, one minute, fifteen minutes, or ten or more hours.

Figure 9:
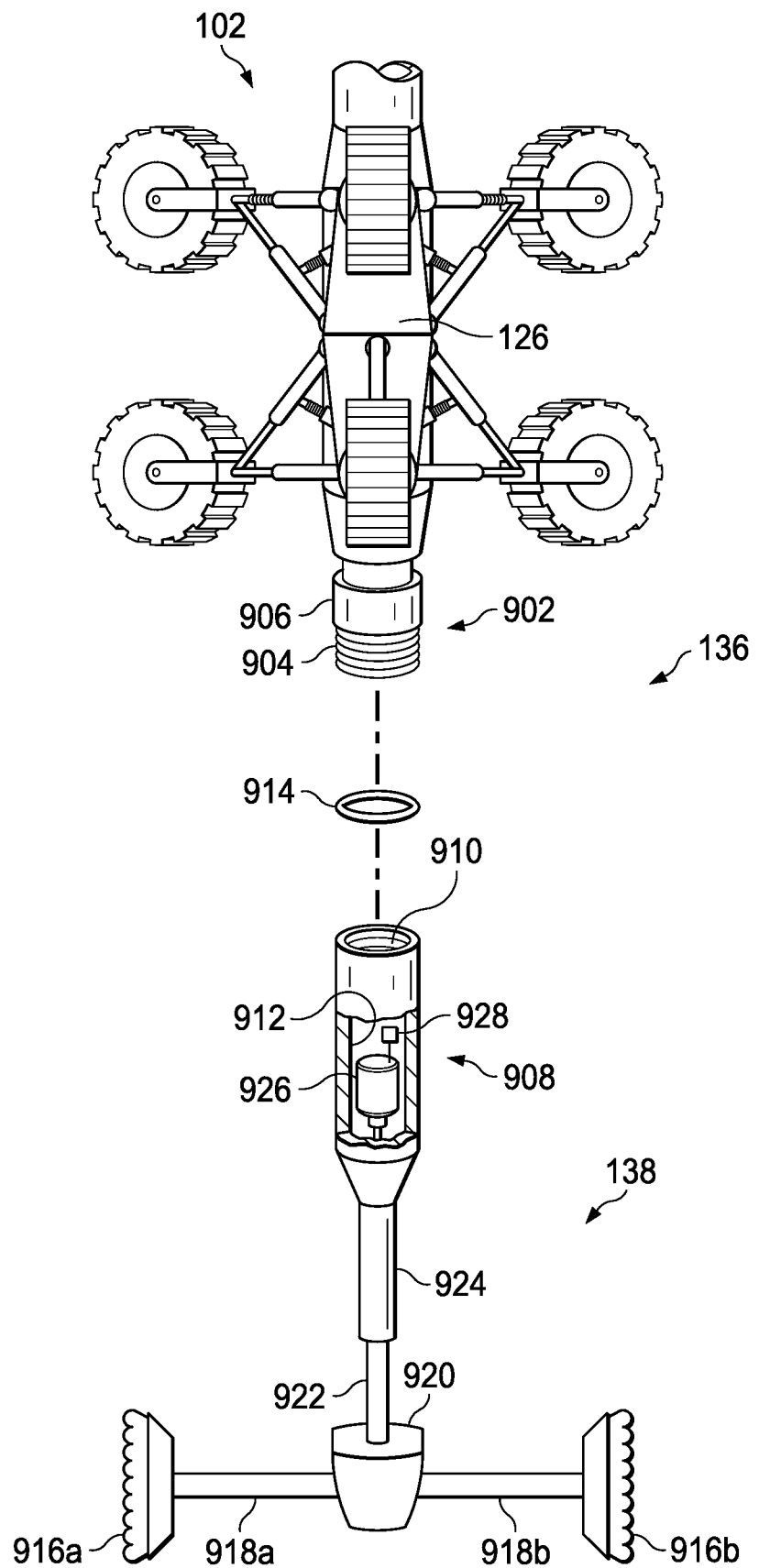
FIG. 9 is a schematic view of a tool connection of the wellbore maintenance and inspection assembly.

Referring to FIG. 1, the assembly 102 includes a tool connection 136 to couple a tool 138 to the body 126. FIG. 9 is a schematic view of a tool connection of the wellbore maintenance and inspection assembly. Referring to FIG. 9, the tool connection 136 includes a pin connection 902. The pin connection 902 includes threads 904 on an external surface 906 to couple to a box connection 908 of the tool 138. The box connection 908 includes threads 910 on an internal surface 912 of the tool 138 to couple to the threads 904 of the pin connection 902. The threads 904 and 910 can be trapezoidal shaped such as an ACME thread form. The tool connection 136 includes a sealing element 914 to prevent wellbore 104 fluid from entering the body 126 through the tool connection 136. For example, the sealing element can be an O-ring. The tool connection 136 can include cables and/or connections (not shown) to conduct electrical power, control signals, status signals, and other data to and from the tool 138 to the assembly 102.

As shown in FIGS. 1 and 9, the tool 138 performs a maintenance or inspection task on the wellbore 104. The tool 138 includes a brush assembly 140 to clean the inner surface 120 of the wellbore 104. The brush assembly 140 rotate to remove debris 118 adhering to the inner surface 120 of the casing 112.

The brush assembly 140 includes a multiple brush heads 916*a* and 916*b* to scrape and clean the inner surface 120 of the wellbore 104. The brush heads 916*a* and 916*b* are each mechanically coupled to a brush shaft, 918*a* and 918*b* respectively. The brush drive shafts 918*a* and 918*b* rotate to cause the brush heads 916*a* and 916*b* to rotate. The brush drive shafts 918*a* and 918*b* are mechanically coupled to a gearbox 920. The gearbox is also mechanically coupled to a rotatable shaft 922. The rotatable shaft 922 is mechanically coupled a gear connection 924. The gear connection 924 is mechanically coupled to a tool motor 926. The tool motor 926 is positioned within the box connection 908. The tool motor 926 is electrically coupled to and powered by a battery 928. Alternatively or in addition, the brush assembly 140 can be powered by the assembly 102 as described later in reference to FIGS. 1 and 8.

The tool motor 926 operates to rotate the gear connection 924. The gear connection 924 rotates the rotatable shaft 922, which in turn rotates the gearbox 920. The gearbox 920 changes the direction and splits the rotational energy to rotate each of the brush drive shafts 918*a* and 918*b*, which then in turn each rotate the brush heads 916*a* and 916*b*, respectively.

The tool 138 can include one or multiple implements (such as the brush assembly 140) to perform one or multiple maintenance or inspection tasks. Additionally or alternatively the tool 138 can be a survey tool to measure conditions of the wellbore 104. For example, the tool 138 can be a temperature sensor, a pressure sensor, a flow rate sensor, or a caliper. Additionally or alternatively, the tool 138 can be an inclination measurement tool such as a drift tool.

Figure 10:
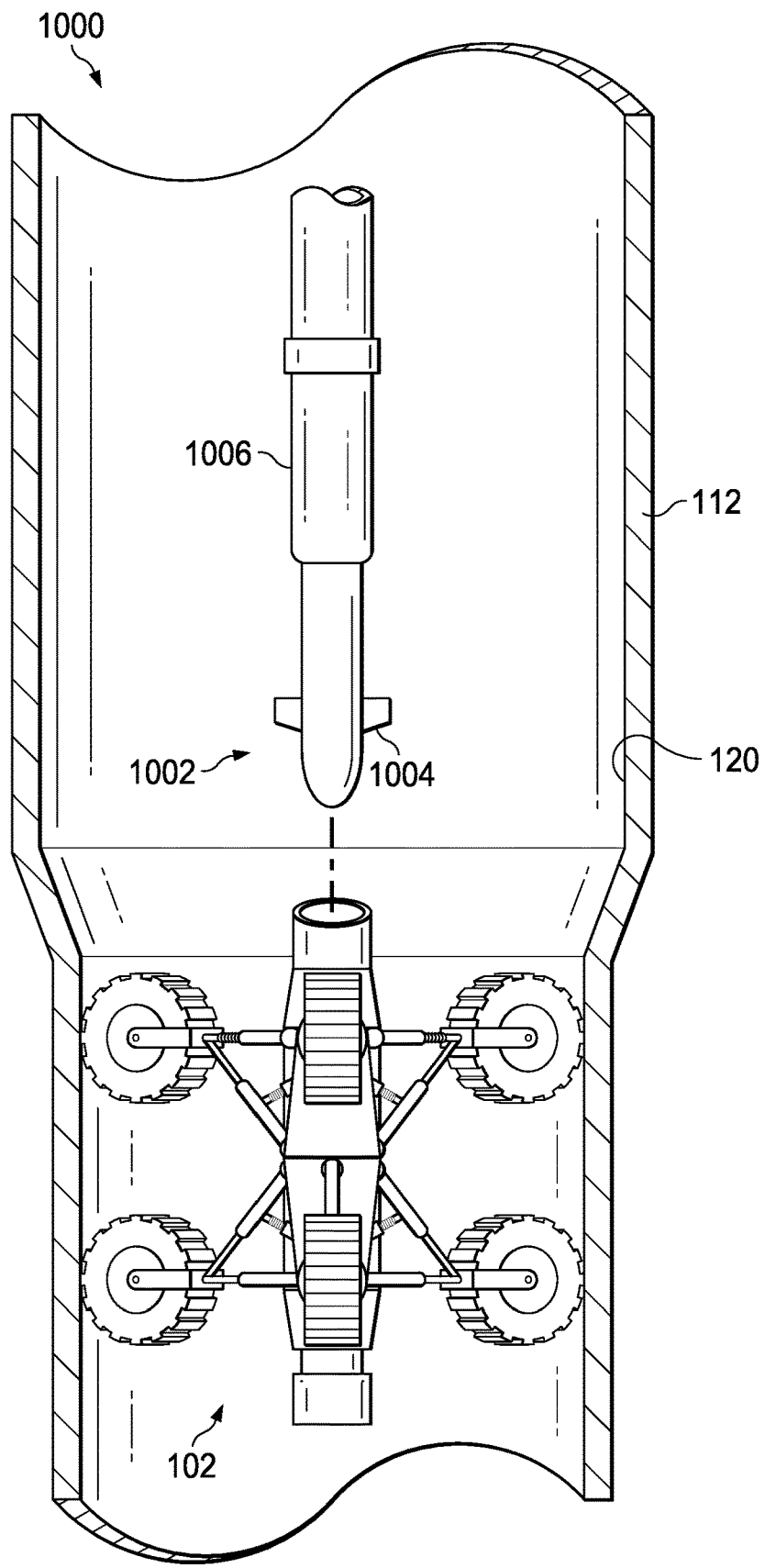
FIG. 10 is a schematic view of a retrieval tool disposed in the wellbore to retrieve the wellbore maintenance and inspection assembly.

Referring to FIG. 1, the assembly 102 includes a backup retrieval mechanism 142 coupled to the body 126. FIG. 10 is a schematic view of a retrieval tool disposed in the wellbore to retrieve the wellbore maintenance and inspection assembly. Referring to FIG. 10, the assembly 102 can be coupled to a retrieval tool 1002 by the backup retrieval mechanism 142. The retrieval tool 1002 includes a fish neck 1004 to engage the backup retrieval mechanism 142. The retrieval tool 1002 can be a GS tool. The retrieval tool 1002 can include a slickline tool 1006 to position the retrieval tool 1002 to couple to the assembly 102. The retrieval tool 1002 can be coupled to the backup retrieval mechanism 142 in an emergency, for example if the assembly 102 loses power or becomes stuck in the casing 112.

Figure 11A:
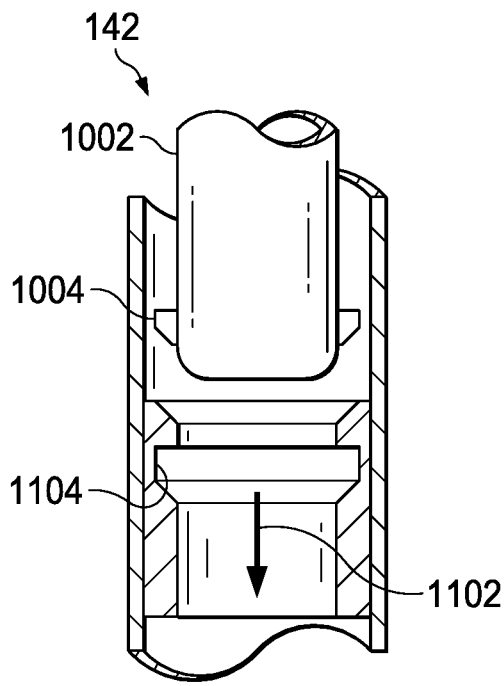
FIGS. 11A-11C are schematic views of the retrieval tool of FIG. 10 engaging and retrieving the wellbore maintenance and inspection assembly.
Figure 11B:
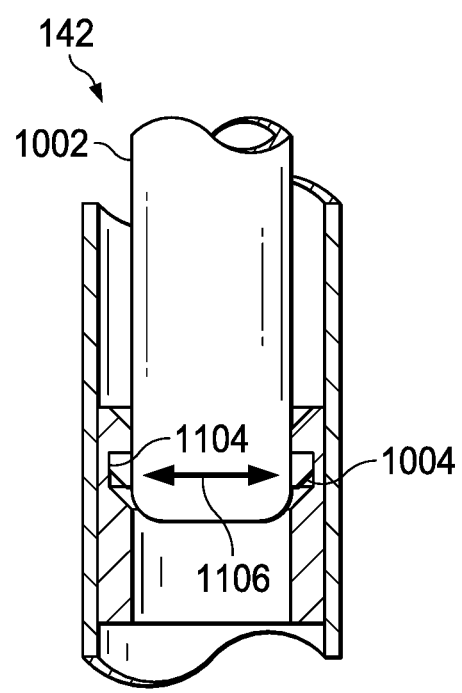
Figure 11C:
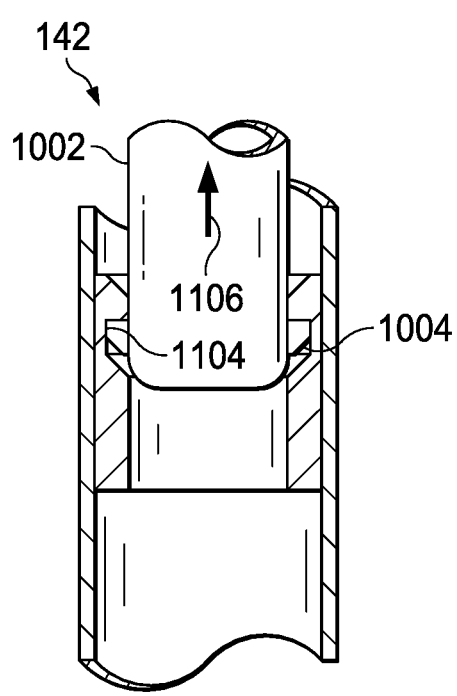

FIGS. 11A-11C are schematic views of the retrieval tool of FIG. 10 engaging and retrieving the wellbore maintenance and inspection assembly. Referring to FIG. 11A, the retrieval tool 1002 moves in a downward direction as shown by arrow 1102 and toward the backup retrieval mechanism 142. The backup retrieval mechanism 142 includes an inner surface 1104 with a profile to engage the fish neck 1004 of the retrieval tool 1002. Referring to FIG. 11B, the fish neck 1004 of the retrieval tool 1002 slides relative to the inner surface 1104 and is then coupled to the inner surface 1104 profile as shown by arrow 1106. Referring to FIG. 11C, the retrieval tool 1002 coupled to the backup retrieval mechanism 142 retrieves the assembly 102 (not shown) out of the casing 112 (not shown) in the direction of arrow 1108.

Referring to FIG. 8, the assembly 102 includes a power sub-assembly 810 to supply power to a control sub-assembly 812, the hydraulic sub-assembly 802, and the tool 138. The power sub-assembly 810 includes a motor 814 coupled to a gearbox assembly 816. The motor 814 powers the gearbox assembly 816 to drive (rotate) the magnetic wheels 204a-f via the drive spring arms 218a-f as described with respect to FIGS. 2-7. The gearbox assembly 816 is coupled to the drive spring arms 218a-f by gearbox linkages 830.

The power sub-assembly 810 includes a battery 818. The battery 818 stores electrical power. The battery 818 supplies electrical power to the motor 814, the control sub-assembly 812, and the tool 138. The battery 818 is electrically coupled to the motor 814 by a power cable 820a. The battery 818 is electrically coupled to the control sub-assembly 812 by a power cable 820b. The battery 818 is electrically coupled to the tool 138 by a power cable 820c.

Figure 12:
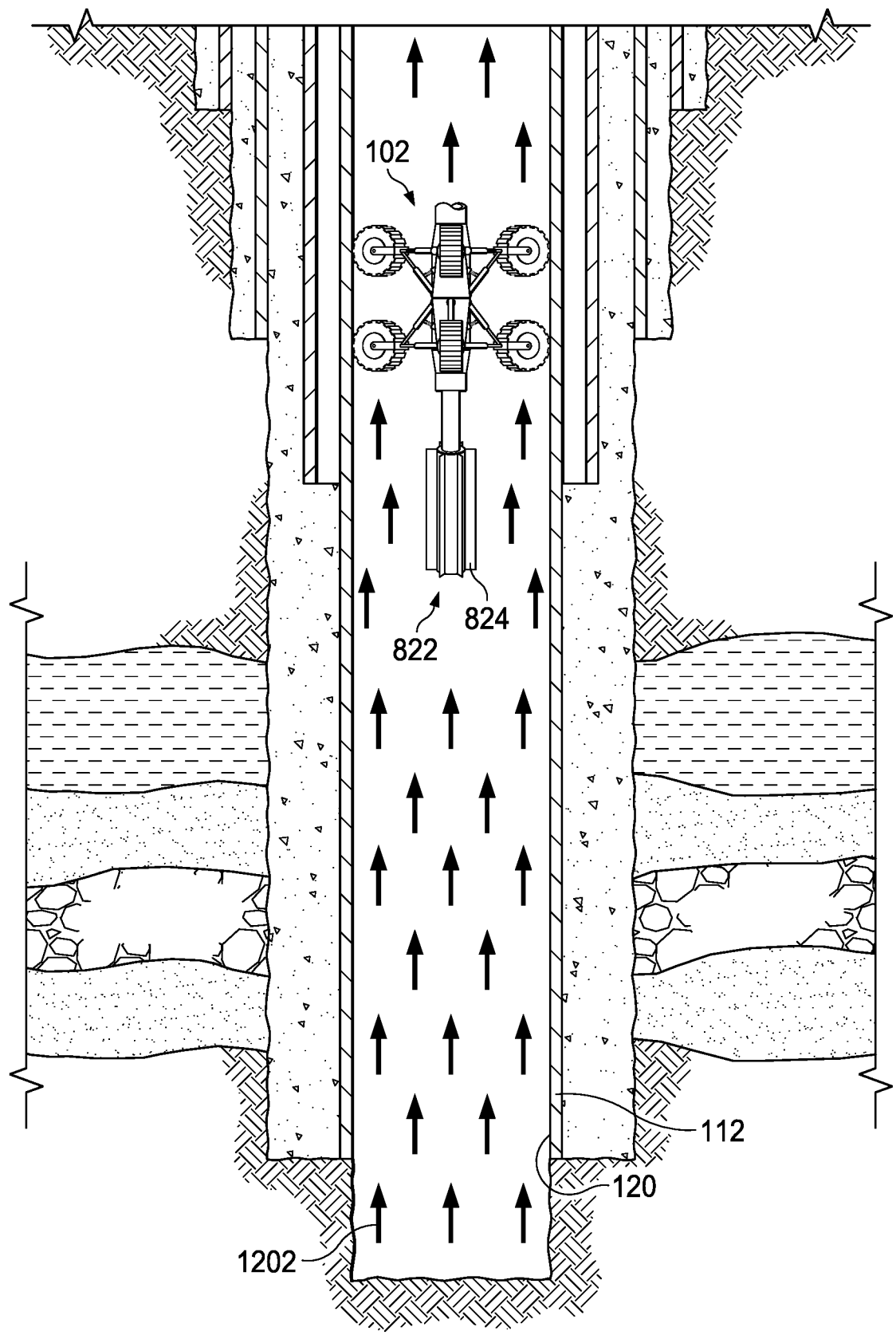
FIG. 12 is a schematic view of a turbine coupled to the wellbore maintenance and inspection assembly.

In some cases, as shown in FIG. 8, the power sub-assembly 810 can include a turbine 822 to power the battery 818. FIG. 12 is a schematic view of a turbine coupled to the wellbore maintenance and inspection assembly. Referring to FIGS. 8 and 12, the turbine 822 includes vanes 824. The fluid in the casing 112 flows over the vanes 824 in the direction of arrows 1202 to generate electrical power which is supplied to the battery 818 through a power cable 820d.

Referring to FIG. 1, the assembly 102 includes the control sub-assembly 812. The control sub-assembly 812 controls the magnetic wheel sub-assemblies 130a-f and operates the tool 138 within the wellbore 104.

The control sub-assembly 812 includes a controller 826. The controller 826 can be a computer and a microprocessor.

The controller 826 has one or more sets of programmed instructions stored in a memory or other non-transitory computer-readable media that stores data (e.g., connected with the printed circuit board), which can be accessed and processed by a microprocessor. The programmed instructions can include, for example, instructions for sending or receiving signals and commands to operate the magnetic wheel sub-assemblies 130a-f, operate the tool 138, and/or collect and store data from a sensor 828. The controller 826 stores values (signals and commands) against which sensed values (signals and commands) representing the condition are compared.

The sensor 828 is positioned within the body 126. The sensor 828 senses a condition in the wellbore 104 and transmits a signal representing the condition to the controller 826. For example, the sensor can sense a pressure, a temperature, a flow rate, a depth, a conductivity, a pH, a dimension of the wellbore 104, an orientation of the body 126 relative to the wellbore 104 and the surface 110 of the Earth, or an optical condition of the wellbore 104.

The controller 826 receives the signal representing the condition from the sensor 828. The controller 826 then compares the signal representing the wellbore condition to the instructions. The recorded values are stored for the logging purposes and evaluated at the surface, similar to other logging tools. While running into or out of the wellbore 104, the controller 826 follows the trajectory that is stored in the processor and keep matching. Additionally, a maximum operating temperature and pressure values can be sensed and stored in the controller 826 when the controller 826 measure any value greater than a maximum operating limit (a maximum safe operating temperature of pressure), the assembly 102 can stop running into (deeper into the) wellbore 104 and proceed toward the surface 110 until a safe operating temperature or pressure is sensed.

In response to the comparison of the signal representing the wellbore condition and the instructions, the controller 826 generates a command signal to operate the magnetic wheel sub-assemblies 130a-f or the tool 138. The command signal can operate the magnetic wheel sub-assemblies 130a-f to rotate, stop rotating, or lock one or more of the magnetic wheels by operating the gearbox assembly 816 to control the gearbox linkages 830 as described in reference to FIGS. 2-5 and 7.

The command signal can operate the magnetic wheel sub-assemblies 130a-f to extend or retract the hydraulic arms 208a-f as described in reference to FIG. 6. For example, when the condition is the dimension of the casing 112, the controller 826 receives a first dimension 612 of the casing 112. Then, the controller 826 receives a second dimension 614 of the casing 112, for example, when the assembly 102 approaches the narrowing 602 as shown in FIG. 6. The controller 826 then compares the first dimension 612 to the second dimension 614. In response to the comparison of the first dimension 612 to the second dimension 614 indicating a wellbore narrowing 602, the controller generates a command signal to reposition the magnetic wheel sub-assemblies 130b, 130d, and 130f relative to the body 126 in response to the wellbore narrowing 602. As the assembly 102 continues through the wellbore narrowing 602, the controller 826 generates a command signal to reposition the magnetic wheel sub-assemblies 130a, 130c, and 130e relative to the body 126.

In a similar manner, the controller 826 generates a command signal to reposition the magnetic wheel sub-assemblies 130b, 130d, and 130f relative to the body 126 in response to the wellbore widening 604, then the magnetic wheel sub-assemblies 130a, 130c, and 130e relative to the wellbore widening 604. The controller 826 receives the second dimension 614 of the casing 112. Then, the controller 826 receives the first dimension 612 of the casing 112. The controller 826 then compares the second dimension 614 to the first dimension 612. In response to the comparison of the second dimension 614 and first dimension 612 indicating the wellbore widening 604, the controller generates a command signal to reposition the magnetic wheel sub-assemblies 130b, 130d, and 130f relative to the body 126 in response to a wellbore widening 604. As the assembly 102 continues through the wellbore widening 604, the controller 826 generates a command signal to reposition the magnetic wheel sub-assemblies 130a, 130c, and 130e relative to the body 126.

The control sub-assembly 812 includes a telemetry receiver 832. The telemetry receiver 832 receives a reprogramming signal from a remote control station (not shown). The remote control station can be an operating station at the surface 110 which transmits the reprogramming signal through the wellbore 104 and is received by the telemetry receiver 832. For example, the telemetry receiver 832 can be an antenna. The reprogramming signal instructs the one or more computer processors to perform a different operation from the operation stored in the non-transitory computer-readable storage medium. For example, when the assembly 102 includes multiple tools 138 and an operator re-tasks the assembly 102 based on a sensed wellbore condition, for example, excessive debris 118 requiring a specific type of brush assembly 140 to clean, the operator can direct the brush assembly 140 to be exchanged, such as between a wire bristle brush or a nylon bristle brush. For example, when the assembly 102 approaches the wellbore narrowing 602 to narrow to pass, the operator can direct the assembly 102 to return to the surface 110 or enter another portion of the wellbore 104, for example a lateral branch of a multi-lateral well. For example, when the assembly 102 become stuck in the wellbore 104, the operator can send a command to the assembly 102 to transmit any stored data so the operator can evaluate downhole conditions (for example pressure and temperature. The operator can then use the downhole conditions to prepare a plan to mechanically retrieve the assembly 102 as described in reference to FIGS. 10-11.

Figure 13:
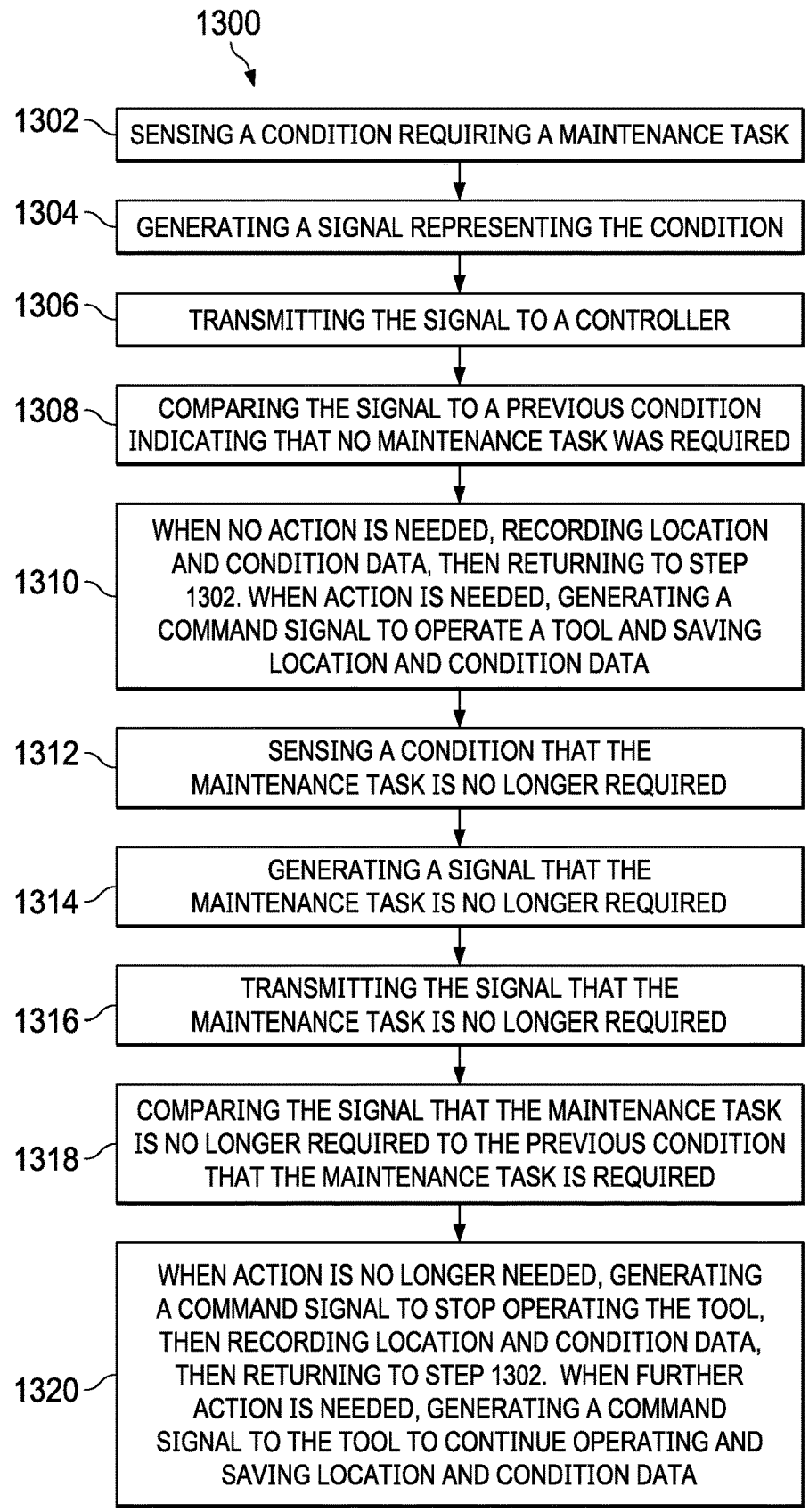
FIG. 13 is a flowchart of a control algorithm for cleaning the wellbore with the wellbore maintenance and inspection assembly.

FIG. 13 is a flowchart of a control algorithm for cleaning the wellbore with the wellbore maintenance and inspection assembly. Referring to FIGS. 1, 8, and 13, at 1302, the sensor 828 senses a condition requiring a maintenance task, for example, the accumulation of debris 118 creating the restriction 122. The sensor 828 can sense where the pressure, the flow rate, the dimension of the casing 112, or the optical condition indicate the restriction 122 in the casing 112. At 1304, the sensor 828 generates a signal representing the condition requiring the maintenance task, for example the restriction 122. At 1306, the sensor 828 transmits the signal representing the condition requiring the maintenance task, for example, restriction 122 in the casing 112 to the controller 826.

At 1308, the controller 826 compares the signal representing the condition requiring a maintenance task, for example, the restriction 122, to a previous condition indicating that no maintenance task was required, for example a casing diameter or surface condition (cleanliness, pitting). At 1310, when the controller 826 determines that no action is needed based on the results of the comparison, the controller 826 records data correlating to the location and condition for further analysis and returns to step 1302. When the controller 826 determines that action is needed based on the results of the comparison, the controller 826 generates a command signal to the tool 138 to operate while the condition requiring the maintenance task is met. The controller 826 saves data correlating to the location and condition. For example, when the controller 826 senses the restriction 122 due to debris 118 accumulation, the controller 826 generates a commands signal to the brush assembly 140 to engage the inner surface and rotate, removing the restriction 122.

At 1312, the sensor 828 senses a condition indicating that the maintenance task is no longer required. For example, the accumulation of debris 118 creating the restriction 122 is clear. For example, the sensor 828 senses when the pressure, the flow rate, the dimension of the casing 112, or the optical condition indicate the restriction 122 is removed. At 1314, the sensor 828 generates a signal representing the condition indicating that the maintenance task is no longer required, for example, the restriction 122 is removed. At 1316, the sensor 828 transmits the signal representing the condition indicating that the maintenance task is no longer required, for example, the restriction 122 is removed, to the controller 826.

At 1318, the controller 826 compares the signal representing the condition indicating that the maintenance task is no longer required (the restriction 122 is removed) to another condition, for example the previous condition indicating that the maintenance task is required (the restriction 122 in the casing 112). At 1320, when the controller 826 determines that action is no longer needed, the controller records data correlating to the location and condition for further analysis and returns to step 1302. When the controller 826 determines that further action is needed, the controller 826 generates a command signal to the tool 138 to continue operating while the condition is met. The controller 826 saves data correlating to the location and condition of the condition.

Figure 14:
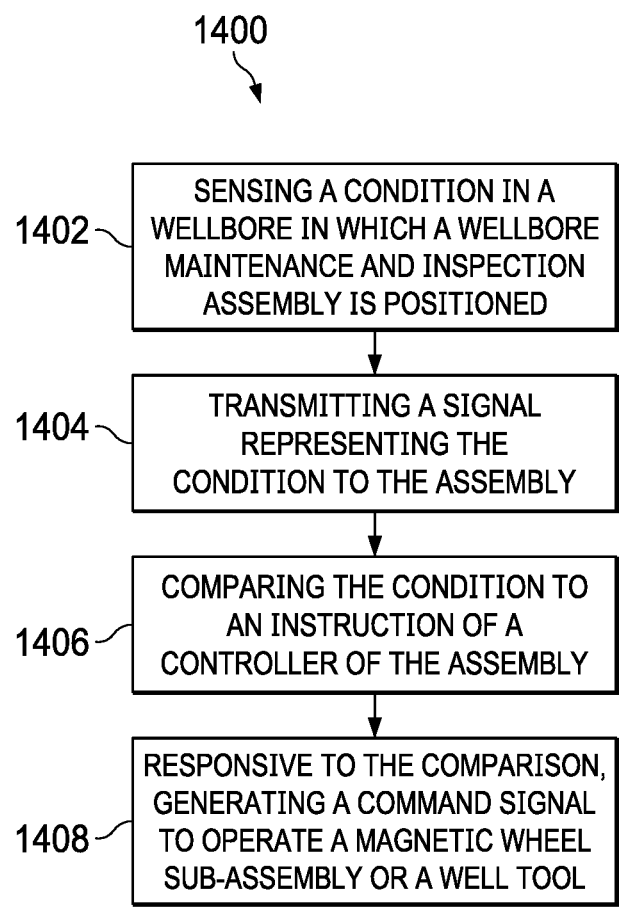
FIG. 14 is a flow chart of an example method of maintaining a wellbore using the wellbore maintenance and inspection assembly according to the implementations of the present disclosure.

FIG. 14 is a flow chart of an example method of maintaining a wellbore using the wellbore maintenance and inspection assembly according to the implementations of the present disclosure. The wellbore maintenance and inspection assembly includes a body, a magnetic wheel assembly, a tool connection, a sensor, a control sub-assembly, a power sub-assembly, and a backup retrieval mechanism. The body is configured to be disposed in a wellbore. The magnetic wheel assembly includes multiple magnetic wheel sub-assemblies adjustably coupled to the body. The magnetic wheel assembly positions the body within the wellbore and reposition the magnetic wheel sub-assemblies relative to the body in response to a wellbore narrowing or a wellbore widening. The tool connection is coupled to the body to couple to couple a well tool to the body.

The sensor senses a condition and transmits a signal representing the condition. The condition is one or more of a pressure, a temperature, a depth, a conductivity, a pH, a dimension of the wellbore, or an orientation of the body relative to the wellbore and a surface of the Earth. The control sub-assembly is coupled to the body. The control sub-assembly is operatively coupled to the magnetic wheel assembly and to the tool connection. The control sub-assembly includes one or more computer processors and a non-transitory computer-readable storage medium storing instructions executable by the one or more computer processors to cause the one or more computer processors to perform operations. The operations include receiving a signal representing the condition from the sensor; comparing the signal representing the wellbore condition to the instructions; and responsive to the comparison of the signal representing the wellbore condition and the instructions; generating a command signal to operate the magnetic wheel sub-assembly or the well tool.

The power sub-assembly supplies power to the control sub-assembly and the well tool. The backup retrieval mechanism is coupled to the body. The backup retrieval mechanism couples a retrieval tool to the body.

At 1402, a wellbore condition is sensed. For example, the sensor 828 senses a condition requiring a maintenance task (the accumulation of debris 118 creating the restriction 122). For example, the sensor 828 can sense where the pressure, the flow rate, the dimension of the casing 112, or the optical condition indicate the restriction 122 in the casing 112. At 1404, a signal representing the wellbore condition is transmitted to the control sub-assembly. For example, the sensor 828 senses the wellbore narrowing 602 caused by a change in casing 112 size.

At 1406, the wellbore condition is compared to the instruction. The controller 826 compares the signal representing the condition requiring a maintenance task, for example, the restriction 122, to a previous condition indicating that no maintenance task was required, for example a casing diameter or surface condition (cleanliness, pitting). For example, the controller 826 compares the casing 112 first dimension 612 (inner diameter) to the wellbore narrowing 602 second dimension 614.

At 1408, responsive to the comparison of the signal representing the wellbore condition and the instruction, a command signal is generated to operate the magnetic wheel sub-assembly or the well tool by the control sub-assembly. Where the well tool includes a brush, the command signal directs the well tool to brush a surface of the wellbore to clean the surface of the wellbore. For example, the magnetic wheel sub-assemblies 130b, 130f, and 130d actuate to navigate the assembly 102 into the wellbore narrowing 602.

The command signal can direct the magnetic wheel assembly to engage the magnetic wheel sub-assemblies to the surface of the wellbore. The command signal can direct the magnetic wheel assembly to rotating the magnetic wheel sub-assemblies while engaged to the surface of the wellbore. Responsive to rotating the magnetic wheel sub-assemblies, the wellbore maintenance and inspection assembly is repositioned in the wellbore. The command signal and direct the magnetic wheel sub-assemblies to stop rotating.

The command signal can direct the magnetic wheel assembly to lock the magnetic wheel sub-assemblies. Locking the magnetic wheel sub-assemblies prevents rotation of the magnetic wheel sub-assemblies. The command signal can direct the magnetic wheel assembly to engage the locked magnetic wheel sub-assemblies to the surface of the wellbore. Responsive to engaging the locked magnetic wheel sub-assemblies to the surface of the wellbore, the wellbore maintenance and inspection assembly is maintained the position of in the wellbore. The command signal can direct the magnetic wheel assembly to disengage the locked magnetic wheel sub-assemblies from the surface of the wellbore. The command signal can direct the magnetic wheel assembly to unlock the magnetic wheel sub-assemblies. Unlocking the magnetic wheel sub-assemblies allows rotation of the magnetic wheel sub-assemblies.

In some implementations, the power sub-assembly includes a turbine. Where the power sub-assembly includes a turbine, the method further includes generating power responsive to a wellbore fluid flow. The method then includes supplying the power to the power sub-assembly to power the control sub-assembly or the well tool.

In some implementations, where the condition is the dimension of the wellbore, the method includes receiving a first dimension of the wellbore. The method includes receiving a second dimension of the wellbore. The method includes comparing the first dimension to the second dimension. The method includes, responsive to the comparison of the first dimension of the wellbore to the second dimension of the wellbore, where the comparison indicates the wellbore narrowing, generating a command signal to reposition the magnetic wheel sub-assemblies relative to the body in response to the wellbore narrowing. The method includes, where the comparison indicates the wellbore widening, generating a command signal to reposition the magnetic wheel sub-assemblies relative to the body in response to the wellbore widening.

Although the following detailed description contains many specific details for purposes of illustration, it is understood that one of ordinary skill in the art will appreciate that many examples, variations, and alterations to the following details are within the scope and spirit of the disclosure. Accordingly, the example implementations described herein and provided in the appended figures are set forth without any loss of generality, and without imposing limitations on the claimed implementations.

Although the present implementations have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The invention claimed is:

1. A wellbore maintenance and inspection assembly comprising:
   a body configured to be disposed in a wellbore;
   a magnetic wheel assembly comprising a plurality of magnetic wheel sub-assemblies adjustably coupled to the body, the plurality of magnetic wheel sub-assemblies comprising six magnetic wheel sub-assemblies, each of the magnetic wheel sub-assemblies configured to:
      position the body within the wellbore,
      reposition the plurality of magnetic wheel sub-assemblies relative to the body in response to a wellbore narrowing or a wellbore widening, and
      wherein each of the magnetic wheel sub-assemblies comprise:
         a magnetic wheel configured to couple to a surface of the wellbore;
         a hydraulic arm coupled to the magnetic wheel and the body, the hydraulic arm configured to extend or retract along a length of the hydraulic arm to position the magnetic wheel in contact with the surface of the wellbore;
         a support arm coupled to the hydraulic arm and the body, the support arm configured to extend or retract telescopically to support the hydraulic arm; and
         a drive spring arm pivotably coupled to the magnetic wheel and the body, the drive spring arm comprising a spring assembly, the drive spring arm configured to:
            adjust, by the spring assembly, an overall length of the drive spring arm in response to a change in an overall length of the hydraulic arm;
            articulate by pivoting relative to the body about a pivot joint in response to the hydraulic arm positioning the magnetic wheel; and
            rotate the magnetic wheel;

a tool connection mechanically coupled to the body, the tool connection configured to couple a well tool to the body;

a control sub-assembly mechanically coupled to the body, the magnetic wheel assembly, and the tool connection, the control sub-assembly configured to:
control the magnetic wheel assembly, and
operate the well tool within the wellbore;

a power sub-assembly disposed within the body, the power sub-assembly configured to supply power to the control sub-assembly and the well tool; and a backup retrieval mechanism mechanically coupled to the body, the backup retrieval mechanism configured to couple to a retrieval tool.

2. The assembly of claim 1, further comprising a hydraulic sub-assembly configured to flow a hydraulic fluid to and from each hydraulic arm of each magnetic wheel assembly.

3. The assembly of claim 2, wherein the hydraulic sub-assembly comprises:
a hydraulic fluid supply reservoir;
a hydraulic control valve configured to control a fluid flow to and from each hydraulic arm; and
a plurality of hydraulic conduits fluidically coupled to the hydraulic fluid supply reservoir and each hydraulic arm to flow the fluid to flow a hydraulic fluid to and from each hydraulic arm.

4. The assembly of claim 1, further comprising a well tool configured to perform a maintenance or inspection task on the wellbore, wherein the well tool comprises brushes to clean the surface of the wellbore.

5. The assembly of claim 1, wherein the control sub-assembly comprises:
a sensor configured to sense a condition and transmit a signal representing the condition, wherein the condition is one or more of a pressure, a temperature, a depth, a conductivity, a pH, a dimension of the wellbore, or an orientation of the body relative to the wellbore and the surface of the Earth;
one or more computer processors; and
a non-transitory computer-readable storage medium storing instructions executable by the one or more computer processors to cause the one or more computer processors to perform operations comprising:
receiving the signal representing the condition from the sensor;
comparing the signal representing the condition to the instructions; and
responsive to the comparison of the signal representing the condition and the instructions, generating a command signal to operate the magnetic wheel sub-assembly or the well tool.

6. The assembly of claim 5, wherein the condition is the dimension of the wellbore, the one or more computer processors are further configured to:
receive a first dimension of the wellbore;
receive a second dimension of the wellbore;
compare the first dimension to the second dimension; and
responsive to the comparison of the first dimension of the wellbore to the second dimension of the wellbore, wherein the comparison indicates the wellbore narrowing, generate a command signal to reposition the plurality of magnetic wheel sub-assemblies relative to the body in response to the wellbore narrowing.

7. The assembly of claim 5, wherein the condition is the dimension of the wellbore, the one or more computer processors are further configured to:
receive a first dimension of the wellbore;
receive a second dimension of the wellbore;
compare the first dimension to the second dimension; and
responsive to the comparison of the first dimension of the wellbore to the second dimension of the wellbore, wherein the comparison indicates the wellbore widening, generate a command signal to reposition the plurality of magnetic wheel sub-assemblies relative to the body in response to the wellbore widening.

8. The assembly of claim 6, wherein the control sub-assembly comprises a telemetry receiver configured to receive a reprogramming signal from a remote control station, wherein the reprogramming signal instructs the one or more computer processors to perform a different operation from the operation stored in the non-transitory computer-readable storage medium.

9. The assembly of claim 6, wherein the command signal comprises a signal to the magnetic wheel assembly to rotate, stop rotating, or lock one or more of the magnetic wheels.

10. The assembly of claim 7, wherein one or more of the magnetic wheels are locked when engaged to the surface of the wellbore.

11. The assembly of claim 1, wherein the power sub-assembly further comprises a turbine configured to:
generate power from a wellbore fluid flow; and
supply the power to the power sub-assembly to power the control sub-assembly or the well tool.

12. The assembly of claim 1, wherein:
the retrieval tool is a GS tool; and
the backup retrieval mechanism is further configured to couple to the GS tool.

13. A method for maintaining a wellbore with a wellbore maintenance and inspection assembly positioned in the wellbore, the wellbore maintenance and inspection assembly comprising:
a body configured to be disposed in the wellbore;
a magnetic wheel assembly comprising a plurality of magnetic wheel sub-assemblies adjustably coupled to the body, the magnetic wheel assembly configured to:
position the body within the wellbore, and
reposition the plurality of magnetic wheel sub-assemblies relative to the body in response to a wellbore narrowing or a wellbore widening, and
wherein each of the magnetic wheel sub-assemblies comprise:
a magnetic wheel configured to couple to a surface of the wellbore;
a hydraulic arm coupled to the magnetic wheel and the body, the hydraulic arm configured to extend or retract along a length of the hydraulic arm to position the magnetic wheel in contact with the surface of the wellbore;
a support arm coupled to the hydraulic arm and the body, the support arm configured to extend or retract telescopically to support the hydraulic arm; and
a drive spring arm pivotably coupled to the magnetic wheel and the body, the drive spring arm configured to:
articulate by pivoting relative to the body about a pivot joint in response to the hydraulic arm positioning the magnetic wheel; and
rotate the magnetic wheel;
a tool connection mechanically coupled to the body, the tool connection configured to couple a well tool to the body;

a sensor mechanically coupled to the body, the sensor configured to sense a condition and transmit a signal representing the condition, wherein the condition is one or more of a pressure, a temperature, a depth, a conductivity, a pH, a dimension of the wellbore, or an orientation of the body relative to the wellbore and a surface of the Earth;

a control sub-assembly coupled to the body, the control sub-assembly operatively coupled to the magnetic wheel assembly and the tool connection, the control sub-assembly comprising:
  one or more computer processors; and
  a non-transitory computer-readable storage medium storing instructions executable by the one or more computer processors to cause the one or more computer processors to perform operations comprising:
    receiving the signal representing the condition from the sensor;
    comparing the signal representing the condition to the instructions; and
    responsive to the comparison of the signal representing the condition and the instructions, generating a command signal to operate the magnetic wheel sub-assembly or the well tool;

a power sub-assembly configured to supply power to the control sub-assembly and the well tool; and a backup retrieval mechanism mechanically coupled to the body, the backup retrieval mechanism configured to couple to a retrieval tool, the method comprising:
  sensing a condition;
  transmitting a signal representing the condition to the control sub-assembly;
  comparing the condition to the instruction; and
  responsive to the comparison of the signal representing the condition and the instruction, generating a command signal to operate the magnetic wheel sub-assembly or the well tool by the control sub-assembly, wherein responsive to generating the command signal, operating one or more of the magnetic wheel sub-assemblies comprises:
    extending or retracting the hydraulic arm along the length of the hydraulic arm;
    responsive to extending or retracting the hydraulic arm, simultaneously telescopically extending or retracting the support arm to support the hydraulic arm;
    responsive to extending or retracting the hydraulic arm, simultaneously pivoting the drive spring arm relative to the body;
    responsive to extending or retracting the hydraulic arm, positioning the respective magnetic wheel in contact with the surface of the wellbore;
    engaging the plurality of magnetic wheel sub-assemblies to the surface of the wellbore by adjusting an overall length of the drive spring arm in response to a change in the overall length of the hydraulic arm;
    rotating the plurality of magnetic wheel sub-assemblies while engaged to the surface of the wellbore;
    responsive to rotating the plurality of magnetic wheel sub-assemblies, repositioning the wellbore maintenance and inspection assembly in the wellbore; and
    stopping rotating the plurality of magnetic wheel sub-assemblies.

14. The method of claim 13, wherein the well tool comprises a brush coupled to the tool connection, the method further comprises brushing the surface of the wellbore with the brush to clean the surface of the wellbore.

15. The method of claim 13, further comprising:
  locking the plurality of magnetic wheel sub-assemblies, wherein locking the plurality of magnetic wheel sub-assemblies prevents rotation of the magnetic wheel sub-assemblies;
  engaging the locked plurality of magnetic wheel sub-assemblies to the surface of the wellbore;
  responsive to engaging the locked plurality of magnetic wheel sub-assemblies to the surface of the wellbore, maintaining the position of the wellbore maintenance and inspection assembly in the wellbore;
  disengaging the locked plurality of magnetic wheel sub-assemblies from the surface of the wellbore; and
  unlocking the plurality of magnetic wheel sub-assemblies, wherein unlocking the plurality of magnetic wheel sub-assemblies allows rotation of the magnetic wheel sub-assemblies.

16. The method of claim 13, wherein the power sub-assembly comprises a turbine, the method further comprises:
  generating electrical power responsive to a wellbore fluid flow; and
  suppling the power to the power sub-assembly to electrically power the control sub-assembly or the well tool.

17. The method of claim 13, wherein the condition is the dimension of the wellbore, the method comprises:
  receiving, at the controller, a first dimension of the wellbore;
  receiving, at the controller, a second dimension of the wellbore;
  comparing, by the controller, the first dimension to the second dimension; and
  responsive to the comparison of the first dimension of the wellbore to the second dimension of the wellbore:
    wherein the comparison indicates the wellbore narrowing, generating, by the controller, a command signal to reposition the plurality of magnetic wheel sub-assemblies relative to the body in response to the wellbore narrowing; and
    wherein the comparison indicates the wellbore widening, generating, by the controller, a command signal to reposition the plurality of magnetic wheel sub-assemblies relative to the body in response to the wellbore widening.

* * * * *